United States Patent [19]
Yamaguchi

[11] Patent Number: 5,038,391
[45] Date of Patent: Aug. 6, 1991

[54] OPTICAL CHARACTER READER
[75] Inventor: Mikio Yamaguchi, Osaka, Japan
[73] Assignee: Sumitomo Electric Industries, Ltd., Osaka, Japan
[21] Appl. No.: 263,591
[22] Filed: Oct. 27, 1988

[30] Foreign Application Priority Data

| Oct. 30, 1987 | [JP] | Japan | 62-276599 |
| Jan. 4, 1988 | [JP] | Japan | 63-534 |
| Jan. 4, 1988 | [JP] | Japan | 63-535 |
| Jan. 4, 1988 | [JP] | Japan | 63-53388 |
| Mar. 25, 1988 | [JP] | Japan | 63-7297 |
| Jul. 11, 1988 | [JP] | Japan | 63-172442 |
| Jul. 30, 1988 | [JP] | Japan | 63-190773 |

[51] Int. Cl.⁵ .............................................. G06K 9/00
[52] U.S. Cl. ................................. 382/59; 382/57; 382/61
[58] Field of Search ........................... 382/9, 57, 59, 61

[56] References Cited
U.S. PATENT DOCUMENTS
4,797,940 1/1989 Sato et al. ............................. 382/59

OTHER PUBLICATIONS
I.B.M. Technical Disclosure Bulletin, vol. 26, No. 9, Feb. 1984 by Aden et al, pp. 4718-4719.

Primary Examiner—Leo H. Boudreau
Attorney, Agent, or Firm—Cushman, Darby & Cushman

[57] ABSTRACT

An optical character reader comprises a scanner including an image sensor and a binary encoding circuit for converting an output analog signal from the image sensor into a binary signal, a character recognizing means for recognizing each character in a range of view of the image sensor and outputting positional information and a result of recognition, a field selecting means for selecting and outputting a perfect field which is perfectly contained in the range of view of the image sensor on the basis of the positional information and the result of recognition, a format check means for judging whether the perfect field is in accord with a predetermined format or not, and an output judging means for outputting the perfect field being in accord with the predetermined format.

17 Claims, 28 Drawing Sheets

FIG. 4
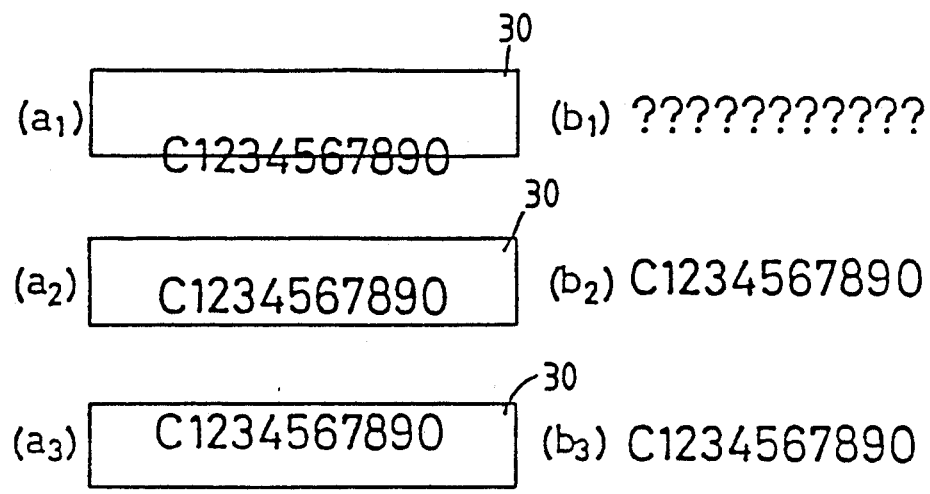
FIG. 5(a)
FIG. 5(b)
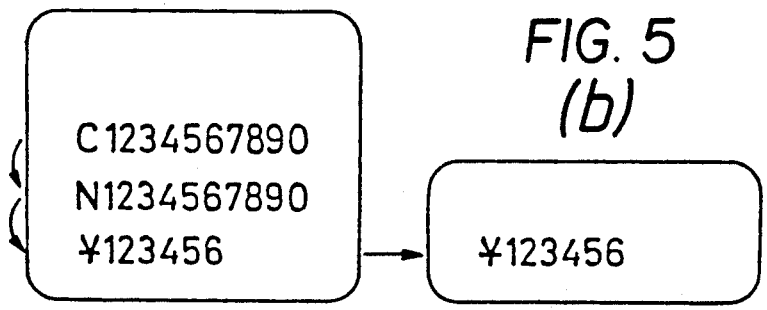
FIG. 7(a)  C1234567890
FIG. 7(b)  C1234S67890
FIG. 7(c)  C1234567890

FIG. 6 (a)
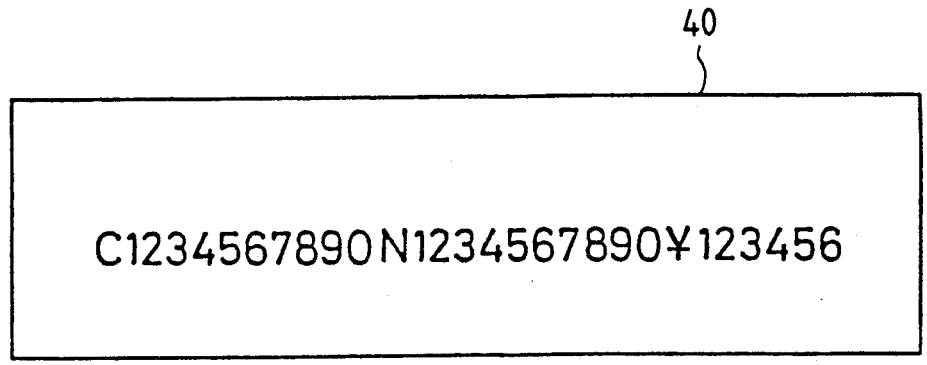
FIG. 6 (b)
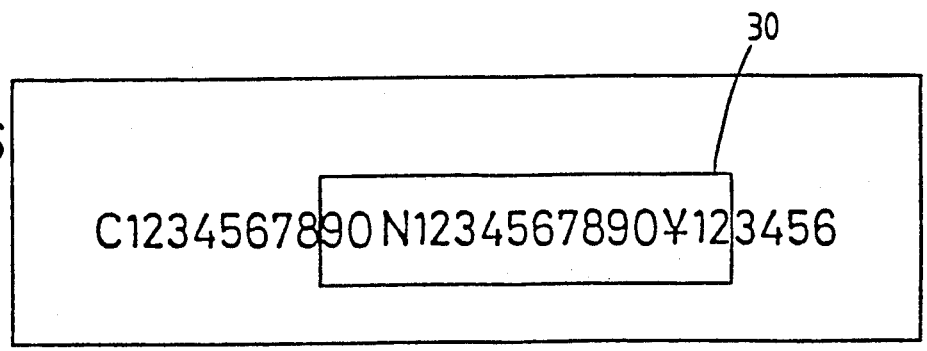
FIG. 6 (c)
$\underbrace{90}_{(c_1)} \underbrace{N1234567890}_{(c_2)} \underbrace{¥12}_{(c_3)}$
FIG. 6 (d)
N1234567890

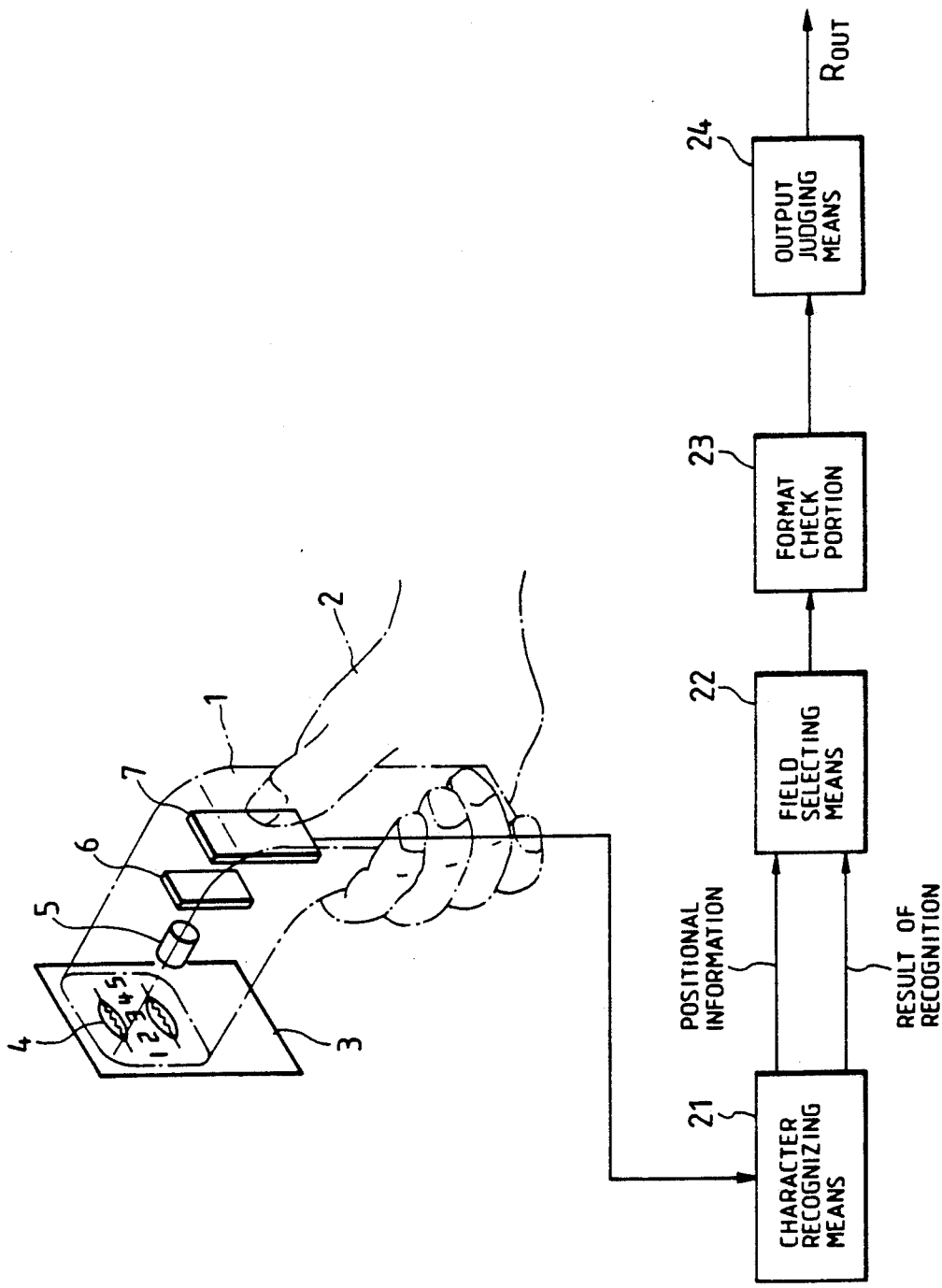

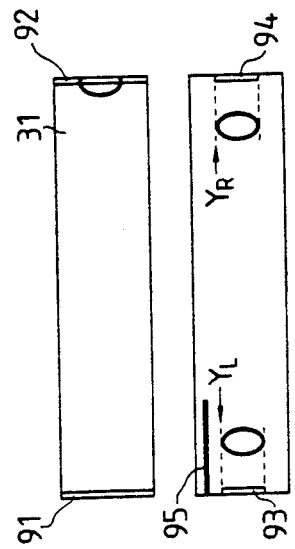
FIG. 22
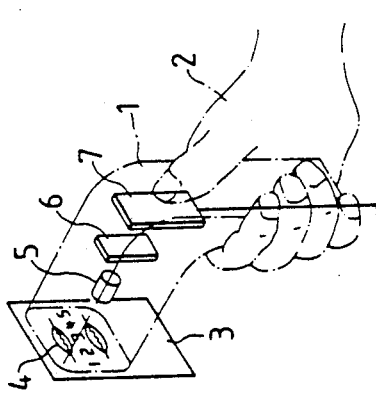
FIG. 23(a)
FIG. 23(b)

FIG. 32
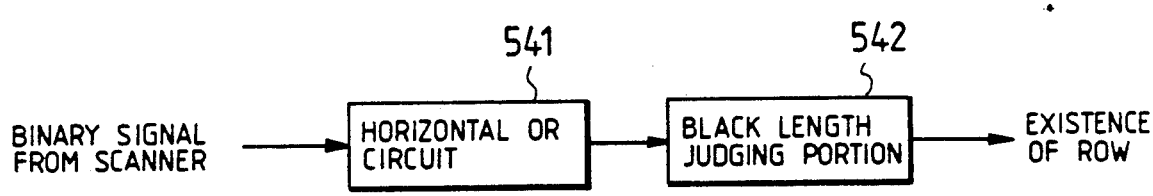
FIG. 33(a)  FIG. 33(b)
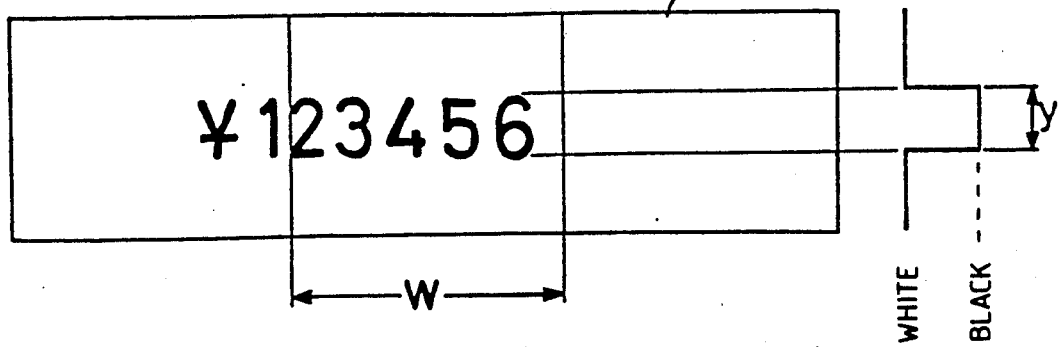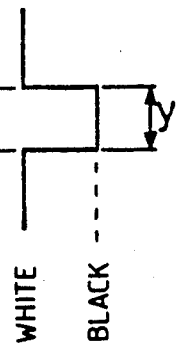

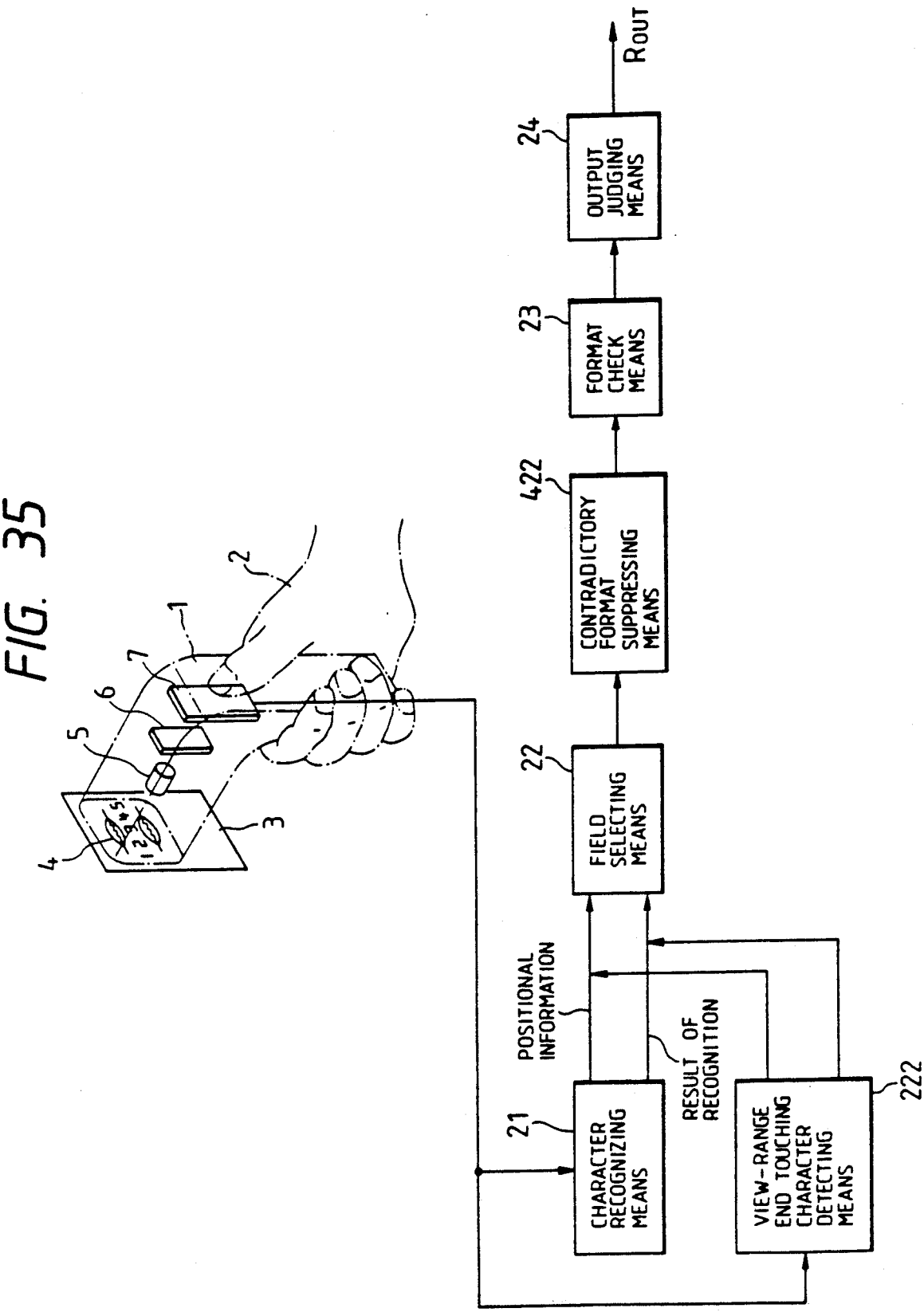

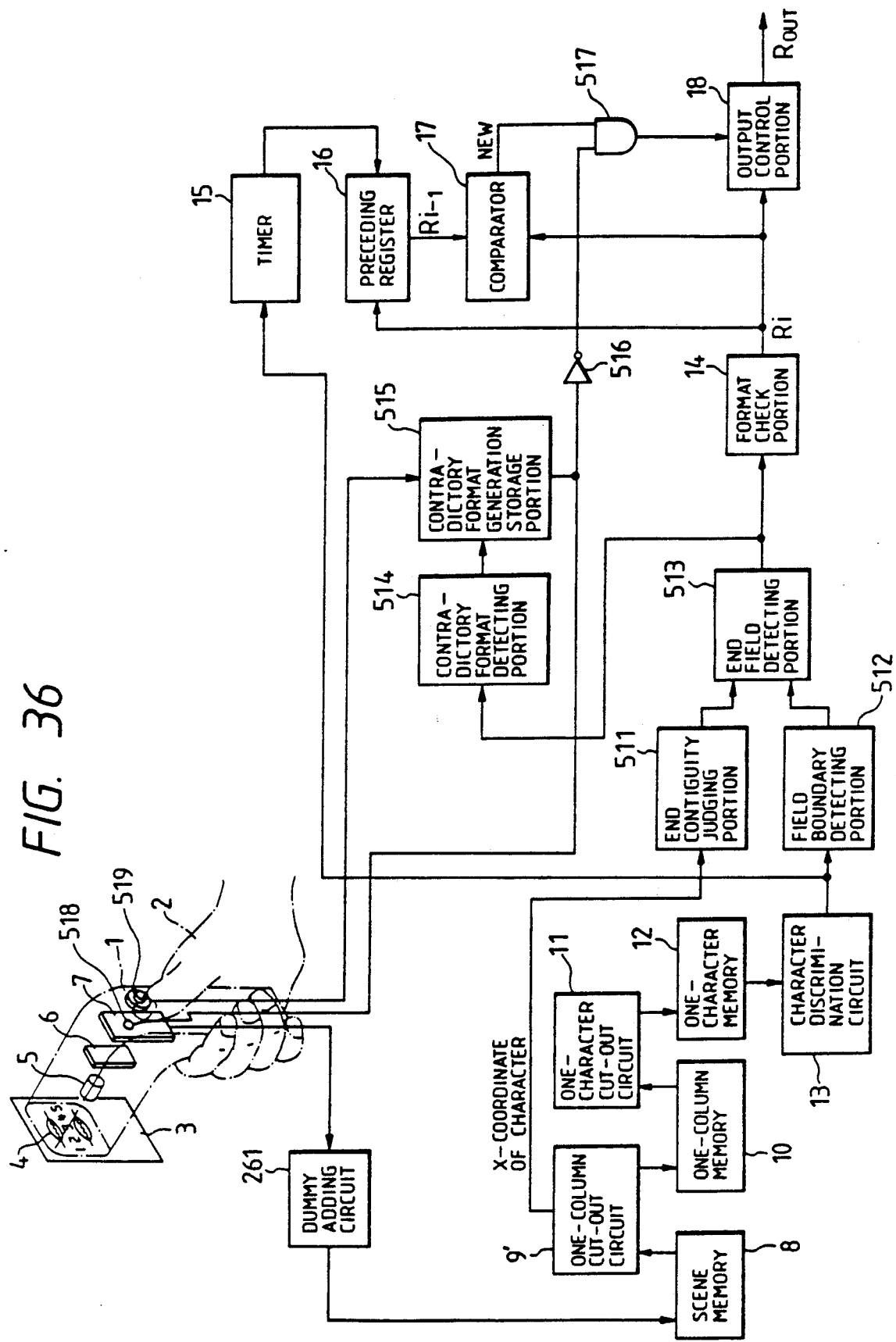

OPTICAL CHARACTER READER

BACKGROUND OF THE INVENTION

1. Field of the Invention

The present invention relates to an optical character reader for reading characters, symbols, and so on, on the basis of the scanning of a subject by a portable scanner. In the following, description will be made only as to characters representatively, but the same will apply to symbols etc., in quite the same manner.

2. Description of the Prior Art

POS (Point Of Sales) systems for managing the stock by reference to the sales data accumulated at every commodity have spread among supermarkets, department stores and the like. Portable optical character readers have been generally used in the POS systems.

A typical diagram of this type portable optical character reader is shown in FIG. 1.

In FIG. 1 the reference numeral 1 designates a scanner which is applied onto a subject 3 by hand 2 to thereby read characters recorded on the subject 3. For example, the subject 3 is a price tag used in a POS system. The reference numeral 4 designates a light source, the reference numeral 5 designates a lens series, and the reference numeral 6 designates an image sensor. It is necessary that the range of view of the image sensor 6 is not less than one field in characters recorded on the price tag 3. In FIG. 1 the range of view of the image sensor 6 is established to be one field and several characters long and about three characters high. The term "field" used herein means one record unit on the price tag. For example, one field is composed of one character "C" defined as a function code and ten numeral characters defined as data characters following the function code. The reference numeral 7 designates a controlling and binary encoding circuit in which an analog signal as an output signal of the image sensor 6 is converted to a binary signal used for discrimination between a character region and a back region, so that the binary signal is sent to a scene memory 8.

The reference numerals 9 to 13 designate means for recognizing each character through the scene memory 8.

Almost all binary data contained in the range of view of the image sensor 6 are stored in the scene memory 8. The binary data of the image sensor 6 are explained with reference to FIG. 2(a), in which the image sensor 6 has ($p \times q$) pixels when the range for view thereof is expressed in a coordinate system (XY).

Characters, inclusive of symbols, are recognized one by one by the character discrimination circuit 13. It is therefore necessary to take out one-character's data from the scene memory 8. The one-column cut-out circuit 9 serves to take out ($m \times q$) pixels' data from the scene memory 8 corresponding to the capacity of the one-character cut-out circuit 11 and then send the data to the one-column memory 10. The one-character cut-out circuit 11 serves to take out ($m \times n$) pixels' data from the one-column memory 10 corresponding to the capacity of the character discrimination circuit 13 and then send the data to the one-character memory 12.

In FIG. 2(a), first of all, the one-column cut-out circuit 9 takes out data represented by the values of X of from 1 to m and the values of Y of from 1 to q, from the scene memory 8 and then sends the data to the one-column memory 10 (FIG. 2($b_1$)). The one-character cut-out circuit 11 takes out n-rows' data (represented by the values of Y of from 11 to $11+n-1$) of the area including character image, judging from the contents of the one-column memory 10, and then sends the data to the one-character memory 12 (FIG. 2($c_1$)). When a certain character is stored in the one-character memory 12, the character is recognized by the character discrimination circuit 13. Next, data represented by the values of X of from 2 to ($m+1$) and the values of Y from 1 to are taken out from the scene memory 8 and then sent to the one-column memory 10 (FIG. 2($b_2$)). Then picture image of the area including character image is sent to the one-character memory 12. The same procedure as described above is repeated till the recognition of all characters in the range of view of the image sensor 6 is completed. In short, the recognition of all characters in the range of view of the image sensor 6 is carried out by the repetition of the procedure comprising the steps of: sending data from the scene memory 8 to the one-column memory 10 while successively shifting the position where the data are taken out; sending picture image including character image to the one-character memory 12; and processing the picture image in the character discrimination circuit 13.

The area to be sent from the one-column memory 10 to the one-character memory 12 is calculated as shown in FIG. 3. First, horizontal ORing of each row in the one-column memory 10 is carried out.

The term "horizontal OR" used herein means an operation in which the result of operation is "1" when one horizontal row has at least one black pixel, and, contrarily, the result is "0" when the row has no black pixel. If the black output of the sensor is represented by "1" and the white output thereof is represented by "0", the result of horizontal ORing is nothing but the result of ORing of all pixels in the row. For this reason, the operation is called "horizontal OR". The result of horizontal ORing only in the portion where a character exists is "black" as shown in FIG. 3(b). When, for example, the horizontal ORing becomes "black" at Y=13, n pixels from Y=11 inclusive of "white" at the upper of the character are sent from the one-column memory to the one-character memory.

By the aforementioned procedure, characters inclusive of symbols contained in the view range of the image sensor 6 can be read.

In FIG. 1 the reference numerals 14 to 18 designate means for generating the result of recognition once when one field on the subject is perfectly read. If the field is contained in the view range, character recognition can be repeated so that the result of recognition can be repeatedly generated from the character discrimination circuit 13. FIG. 4 shows the relationship between the motion of the view range and the change of the result of recognition when the scanner 1 is moved down while applied onto the field "C1234567890". In the position ($a_1$), the corresponding recognition result ($b_1$) is expressed as a rejection (not recognizable: represented by the symbol "?"). In the position ($a_2$) or in the position ($a_3$), the faithful recognition result ($b_2$) or ($b_3$) is obtained because all characters are contained in the view range.

The results ($b_1$), ($b_2$) and ($b_3$) are generated from the character discrimination circuit 13 successively. The reference numeral 14 designates a format check portion for judging whether the recognition result obtained by the character discrimination circuit 13 satisfies a predetermined format (for example, when the field starts from the initial character "C", the initial character must be followed by ten numeral characters as data characters). A timer 15 serves to measure elapsed time after the recognition result is obtained by the character discrimination circuit 13. When the recognition result $R_i$ satisfying the predetermined format is obtained, a preceding register 16, a comparator 17 and an output control portion 18 operate as follows.

In the comparator 17, $R_i$ is compared with $R_{i-1}$ stored in the preceding register 16. When $R_i$ and $R_{i-1}$ lead a discord, the signal of NEW is generated from the comparator 17 so that the output control portion 18 sends $R_i$ as the recognition result $R_{out}$ of the field. When $R_i$ is in accord with $R_{i-1}$, the signal of NEW is not generated from the comparator 17 so that the output control portion 18 does not send $R_i$ (ignores $R_i$). On the other hand, the preceding register 16 stores $R_i$ after the preceding register 16 sends $R_{i-1}$ to the comparator 17. The timer 15 measures elapsed time after the recognition result is obtained by the character discrimination circuit 13. When a predetermined time $T_{CLR}$ is elapsed, the contents of the preceding register 16 are deleted. The preceding register 16 is in a deleting state just after the power supply is put on. $T_{CLR}$ is established to be less than the time (for example, 1 second) required for the exchange of price tags. For example, $T_{CLR}$ is established to be about 0.6 second.

In the case where the field is contained in the view range so that the recognition result can be repeatedly obtained by the character discrimination circuit 13, the cycle of repetition is, for example, about 0.2 second.

The operation of the means 14 to 18 in the reading of a price tag is described with reference to FIGS. 4 and 5. The recognition result ($b_1$) represented by "?" does not satisfy the predetermined format, so that nothing is sent from the format check portion 14. When the scanner is moved down to obtain the recognition result ($b_2$) represented by "C1234567890", the format check portion 14 sends the recognition result as $R_i$ because the recognition result satisfies the predetermined format. Although the comparator 17 serves to compare $R_i$ with the contents $R_{i-1}$ of the preceding register, $R_i$ and $R_{i-1}$ are not the same just after the power supply is put on, because the preceding register is in a deleting state. Accordingly, the signal of NEW from the comparator 17 is sent to the output control portion 18, so that the recognition result "C1234567890" is sent out as the output $R_{OUT}$ form the Output control portion 18. On the other hand, the recognition result "C1234567890" is stored in the preceding register 16. Next, the recognition result ($b_3$) represented by "C1234567890" is obtained. The recognition result ($b_3$) is sent to the comparator 17 through the format check portion in the same manner as in the case of ($b_2$). However, the contents $R_{i-1}$ of the preceding register 16 have been changed to "C1234567890". Because $R_i$ is in accord with $R_{i-1}$, the signal of NEW is not generated from the comparator and, accordingly, the recognition result is not sent out as $R_{OUT}$ from the output control portion 18. In short, the recognition result $R_{OUT}$ is sent out only once corresponding to one field entering into the view range.

The operation in the case where the scanner is moved to read multi-row fields is described with reference to FIG. 5. It is now assumed that formats of fields respectively having initial characters C, N and Y are registered in the format check portion 14. When the scanner is applied onto one row "C1234567890" of the price tag (a), the recognition result $R_{OUT}$ is sent out only once in the same manner as described above. When, for example, the scanner is moved down to be applied onto the next row "N1234567890", the field "N1234567890" enters into the view range. Because the contents $R_{i-1}$ of the preceding register are "C1234567890" when the recognition result "N1234567890" is first obtained by the character discrimination circuit 13, the signal of NEW is generated from the comparator 17 so that the recognition result "N1234567890" can be sent out as $R_{OUT}$. If the recognition result "N1234567890" is repeatedly obtained by the character discrimination circuit 13 after that, the recognition result cannot be sent out as $R_{OUT}$ because it is in accord with the contents of the preceding register. In short, the recognition result "N1234567890" is sent out only once. When, for example, the scanner is further moved down so that the new row "Y123456" enters into the view range, the recognition result "Y123456" is sent out as $R_{OUT}$. In the case of POS price tag in accordance with JIS B9551, fields in one price tag are different from each other in their contents. Accordingly, judgment as to whether the same field is read or not can be made on the basis of comparison between the preceding recognition result $R_{i-1}$ and the current recognition result $R_i$ by the comparator 17.

During the exchange of price tags from (a) to (b), no character is contained in the view range. Accordingly, in this condition, there is no output obtained from the character discrimination circuit 13. Because the timer 15 always measures elapsed time after the recognition result is sent out by the character discrimination circuit 13, the contents of the preceding register 16 are deleted if the output keeps not being obtained from the character discrimination circuit 13 for a period longer than $T_{CLR}$ for the reason of exchange of price tags. Accordingly, when the scanner is applied onto the field "Y123456" after the exchange to the price tag (b), the field "Y123456" can be sent out. In short, different price tags can be read continuously though the contents of fields may be the same. It is apparent from the above description that the timer 15 has the function of detecting the exchange of subjects (price tags).

In the price tag of FIG. 5(*a*), fields respectively having initial characters C, N and Y are written row by row.

FIG. 6(*a*) shows a (multi-field) price tag 40 in which a plurality of fields are written on one row. Because the plurality of fields are written on one row, the width of the row is more than the width of the view range of the image sensor though the width (number of characters) of each field is less than the width of the view range of the image sensor. However, the middle field having the initial character "N" cannot be read by the conventional optical character reader, even though the scanner in the conventional optical character reader is applied onto the middle field of "N" to attempt to read the middle field as shown in FIG. 6(*b*). The reason is that all characters contained in the view range 30 of the image sensor as shown in FIG. 6(*b*) are recognized by the character discrimination circuit 13, thus to obtain a recognition result as shown in FIG. 6(*c*). Because parts ($c_1$) and ($c_3$) of the recognition result due to fields being not perfectly contained in the view range 30 do not have correct formats, a decision of format error is made by the format check portion 14 so that a part ($c_2$) of the recognition result cannot be sent out as the output $R_i$ from the format check portion 14.

As described above, the conventional optical character reader often could not read such a multi-field row.

In practice, some price tags to be read may be written by mistake. An example is shown in FIG. 7, in which (a) represents the correct contents to be written, and (b) represents the incorrect contents in the case where the character "S" was written by mistake for "5". According to the conventional character reader, the contents (b) can not be sent out as it is, because the contents (b) are out of accord with the predetermined format as far as character recognition is made exactly. In short, the conventional character reader cannot read the price tag (b). However, in such a case, the operator would often attempt to change variously how to apply the scanner on the price tag, while the operator does not find the price tag (b) mistaken. For example, the operator would attempt to float up or incline the scanner from the price tag. For the reason, the picture image grasped by the image sensor is often distorted, so that "S" is often misread for "5". In such a case, the price tag would be recognized as (c), so that the mistaken format became in accord with the predetermined format.

As described above, the conventional character reader often misread the miswritten price tag according to the peculiarity of the operator.

SUMMARY OF THE INVENTION

It is therefore a first object of the present invention to provide an optical character reader which can read a multi-field row exactly.

It is a second object of the invention to increase the effective reading width of the view range by using information of character image in an end of the view range of the image sensor.

It is a third object of the invention to prevent the miswritten contents of a incorrect format from being misread.

According to a first aspect of the present invention, the optical character reader comprises: an image sensor; an optical system for forming a picture image on the image sensor; a controlling and binary encoding circuit for converting the output analog signal of the image sensor to a binary signal; a character recognizing means for recognizing each character in a range of view of the image sensor and for sending out positional information showing positions of the characters and a result of recognition; a field selecting means for selecting a field on the basis of the positional information and the recognition result so that only the recognition result of a perfect field perfectly contained in the range of view of the image sensor is selected and sent out; a format check means for judging whether the recognition result of the perfect field is in accord with a predetermined format or not; and an output judging means for sending out the recognition result of the perfect field being in accord with the predetermined format.

According to a second aspect of the present invention, the optical character reader comprises, in addition to the constituent components of the optical reader according to the first aspect of the invention, a view-end touching character detecting means for judging whether character image touches each row-directional end of the view range of the image sensor or whether it does not touch each row-directional end thereof.

According to a third aspect of the present invention, the optical character reader comprises: an image sensor; an optical system for forming a picture image on the image sensor; a controlling and binary encoding circuit for converting the output analog signal of the image sensor to a binary signal; a character recognizing means for recognizing each character in a range of view of the image sensor; a contradictory format suppressing means for judging whether the result of recognition contradicts a predetermined format and for suppressing substantially the reading of characters after the judgment that the result of recognition contradicts the predetermined format; a format check means for judging whether the recognition result is in accord with a predetermined format or not; and an output judging means for sending out the recognition result being in accord with the predetermined format.

BRIEF DESCRIPTION OF THE DRAWINGS

FIG. 4 is a view for explaining the relationship between the change of row in the range of view and the result of character recognition;

FIGS. 5a and 5b are views for explaining the case where a price tag is read;

FIGS. 6a, 6b, 6c and 6d are views for explaining the case where a multi-field price tag is read;

FIGS. 7a, 7b and 7c are views for explaining the case where the row having an error in writing on the price tag is read erroneously;

FIG. 8 is a diagram of an optical reader according to the first aspect of the present invention;

FIG. 22 is a diagram showing a seventh embodiment of the present invention;

FIGS. 23a and 23b are views for explaining the range of black pixel detection;

FIG. 32 is a view showing an example of new row detecting portion;

FIGS. 33(a) and 33(b) are views for explaining the principle of row detection;

FIG. 35 is a diagram of an optical reader generally showing all of the aspects (first to third) of the present invention; and FIG. 36 is a diagram showing a fourteenth embodiment of the present invention.

DETAILED DESCRIPTION OF THE PREFERRED EMBODIMENTS

Figure 1:
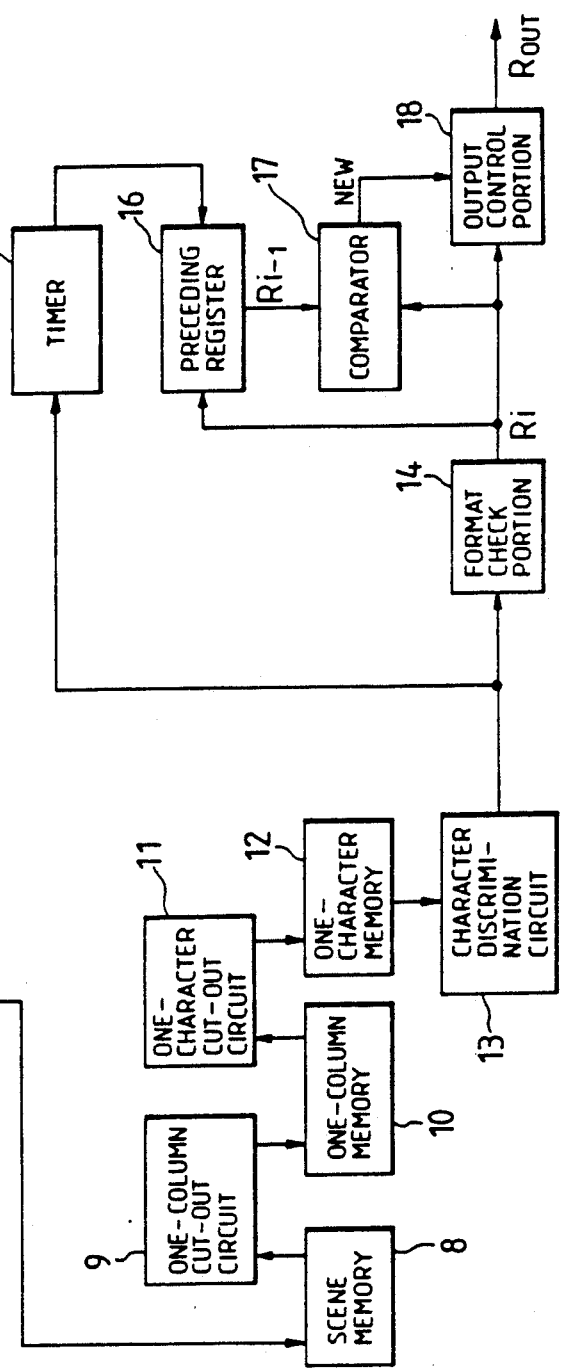
FIG. 1 is a diagram illustrating a conventional optical character reader.
Figure 2A:
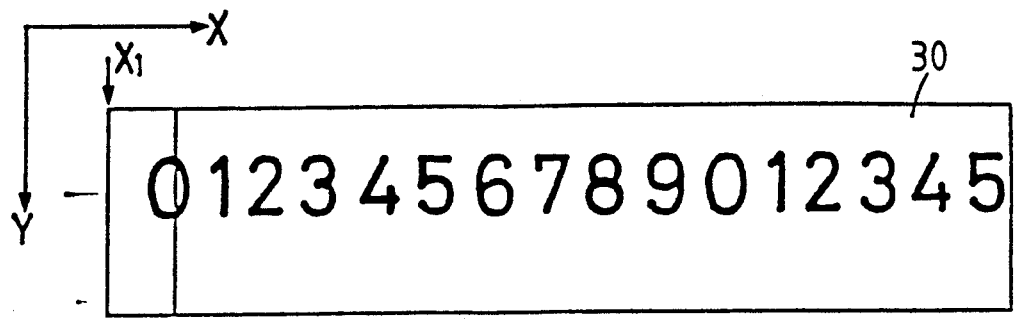
FIGS. 2a, 2b and 2c are views for explaining the procedure to one-character cut-out treatment.
Figure 2B:
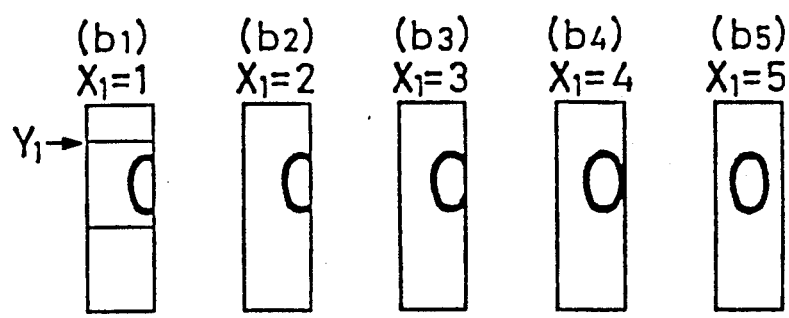
Figure 2C:
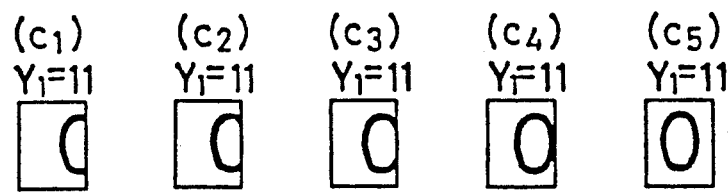
Figure 3A:
FIGS. 3a, 3b and 3c are views for explaining a one-character cut-out method.
Figures 3B, 3C:
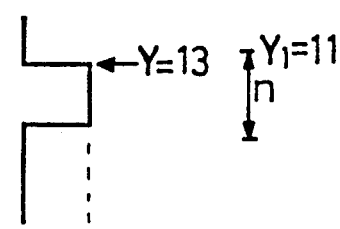

An arrangement according to the first aspect of the present invention is shown in FIG. 8, in which parts designated by the reference numerals 1 to 7 are the same as parts designated by like numerals in FIG. 1. It is necessary that the range of view of the image sensor 6 has a horizontal length in which at least one-field's characters can be perfectly contained and a vertical length in which at least one character can be perfectly contained.

The reference numeral 21 designates a character recognizing means for recognizing each character in the picture image grasped by the image sensor and for sending out the positional information showing the position of the character in the view range and the result of recognition. The reference numeral 22 designates a field selecting means for selecting a field on the basis of the positional information and the recognition result and for sending out the recognition result of the field perfectly contained in the view range. The reference numeral 23 designates a format check means for judging whether the recognition result obtained by the field selecting means 22 is in accord with a predetermined format or not. The reference numeral 24 designates an output judging means for sending out the recognition result only once when the recognition result is in accord with the predetermined format.

When the scanner 1 is applied onto the subject 3 by hand 2, characters on the subject are illuminated by the light source 4. Then a picture image is formed on the image sensor 6 through the lens series 5 and converted to electric signal expressing "white"/"black" by the controlling and binary encoding circuit 7.

Each character in the picture image grasped by the image sensor is recognized by the character recognizing means 21, so that the positional information and the recognition result of the character are given to the field selecting means 22.

If unnecessary fields touching each end of the view range are partly contained in the view range, the field selecting means 22 deletes the unnecessary fields by reference to the positional information so that the recognition result of a necessary field perfectly contained in the view range is sent to the format check means 23.

Referring to FIG. 6, the result of character recognition as shown in FIG. 6(c) is obtained from the character recognizing means 21. Fields ($c_1$) and ($c_3$) touching each end of the view range and partly contained in the view range (not perfectly contained in the view range) are deleted by the field selecting means 22, so that only a field ($c_2$) perfectly contained in the view range is sent to the format check means 23 (FIG. 6(d)).

The format check means 23 judges whether the recognition result obtained from the field selecting means 22 is in accord with the predetermined format or not. If the recognition result is in accord with the predetermined format, the format check means 23 sends the recognition result to the output judging means 24.

The aforementioned procedure is repeated while the scanner 1 is applied onto the row written on the subject 3. However, the output judging means 24 is provided to send out the recognition result only once with respect to the recognition result of the same field repeatedly obtained from the format check portion 14.

First Embodiment

Figure 9:
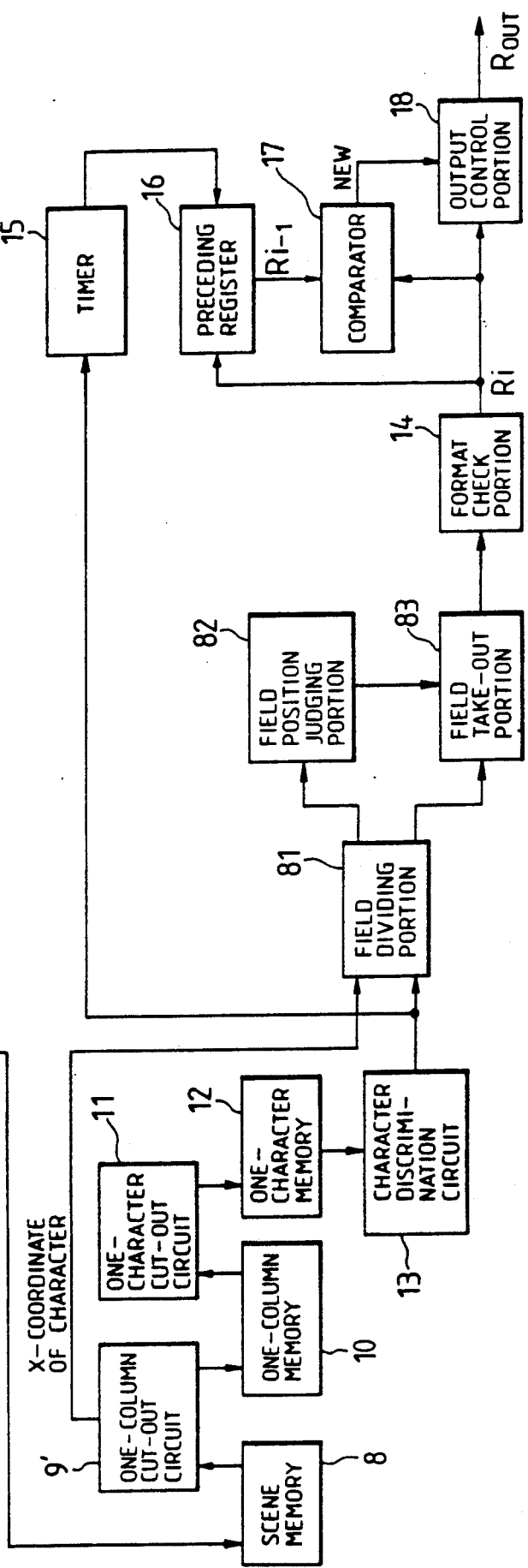
FIG. 9 is a diagram showing a first embodiment of the present invention.

A first embodiment according to the present invention is shown in FIG. 9, in which parts designated by the reference numerals 1 to 18 are about the same as parts designated by like reference numerals in FIG. 1, except that the one-column cut-out circuit 9' in FIG. 9 is arranged to send out the x-coordinate at the time of cutting out to the one-column memory as the x-coordinate of the character. The view range of the image sensor 6 must have a horizontal length long enough to contain all characters of the longest field perfectly. As occasion demands, the horizontal length of the view range may be more than maximum one-field length by two-characters' length. In order to view one field in the view range with ease, it is preferable that the view range has enough large size both horizontally and vertically. In FIG. 9, the view range is established to have about 16 characters' horizontal length (11 characters as maximum one-field's length + 5 characters) and about 3 characters' vertical length. In FIG. 9 the reference numerals 8 to 13 are shown as an example of the character recognizing means 21 of FIG. 8. The format check portion 14 is shown as an example of the format check means 23 of FIG. 8. The reference numerals 15 to 18 are shown as an example of the output judging means 24 of FIG. 8. The reference numerals 81 to 83 are shown as an example of the field selecting means 22 of FIG. 8.

When the scanner 1 is applied onto the subject 3 by hand 2, a character image on the subject 3 is grasped by the image sensor so that each character contained in the view range of the image sensor is recognized by the character recognizing circuit 13. The result of character recognition from the character recognizing circuit 13 and the x-coordinate of the character from the one-column cut-out circuit 9' are fed to a field dividing portion 81.

The field dividing portion 81 serves to divide the character recognition result obtained from the character recognizing circuit 13 for every field. In the case of the price tag of FIG. 6, one field is composed of a function code and data characters following the function code. If a certain function code exists in the recognition result, the function code shows the top of the field. On the basis of the fact, the field dividing portion serves to divide the result of character recognition and the x- coordinate of the character as a counterpart thereto for every field.

A field position judging portion 82 serves to whether the x-coordinate $X_L$ of the left-end character and the x-coordinate $X_R$ of the right-end character in one field satisfy the relation:

$$L_{th} < X_L \text{ and } X_R < R_{th} \ldots \quad (1)$$

in which $L_{th}$ represents the x-coordinate of the second character from the left end of the view range, and $R_{th}$ represents the x-coordinate of the second character from the right end of the view range, each of $L_{th}$ and $R_{th}$ showing a threshold for judgment as to whether the field is in contiguity with each end of the view range. If there is no space character between the characters forming a field, the field satisfying the relation (1) is out of contiguity with each end of the view range or in other words the field is perfectly contained in the view range.

A field take-out portion 83 serves to feed the result of field recognition to the format check portion 14 only in the case where the field position judging portion 82 finds that the field satisfies the relation (1). Although other fields not satisfying the relation (1) (or in other words fields being in contiguity with each end of the view range) are sent from the field dividing portion 81 to the field take-out portion 83, the fields are eliminated at the field take-out portion 83 so that the fields are not sent to the format check portion 14.

By the aforementioned procedure, only the field perfectly contained in the view range is sent to the format check portion 14.

The format check portion 14 performs format check of the field sent from the field take-out portion 83. If the field is in accord with a predetermined format, the format check portion 14 sends the field to the preceding register 16, the comparator 17 and the output control portion 18.

The timer 15, the preceding register 16, the comparator 17 and the output control portion 18 are shown as an example of the output judging means 24 of FIG. 8. The procedure comprising the steps of: recognizing each character in the view range with scanning by the image sensor; taking out a field perfectly contained in the view range; and performing format check of the field taken out, is repeated. However, the result of recognition is sent out as an output $R_{OUT}$ only once in the same manner as described above in the paragraph of "Description of the Prior Art", in the case where the same field is repeatedly obtained as the result of format check by applying the scanner on the same field.

Second Embodiment

Figure 10:
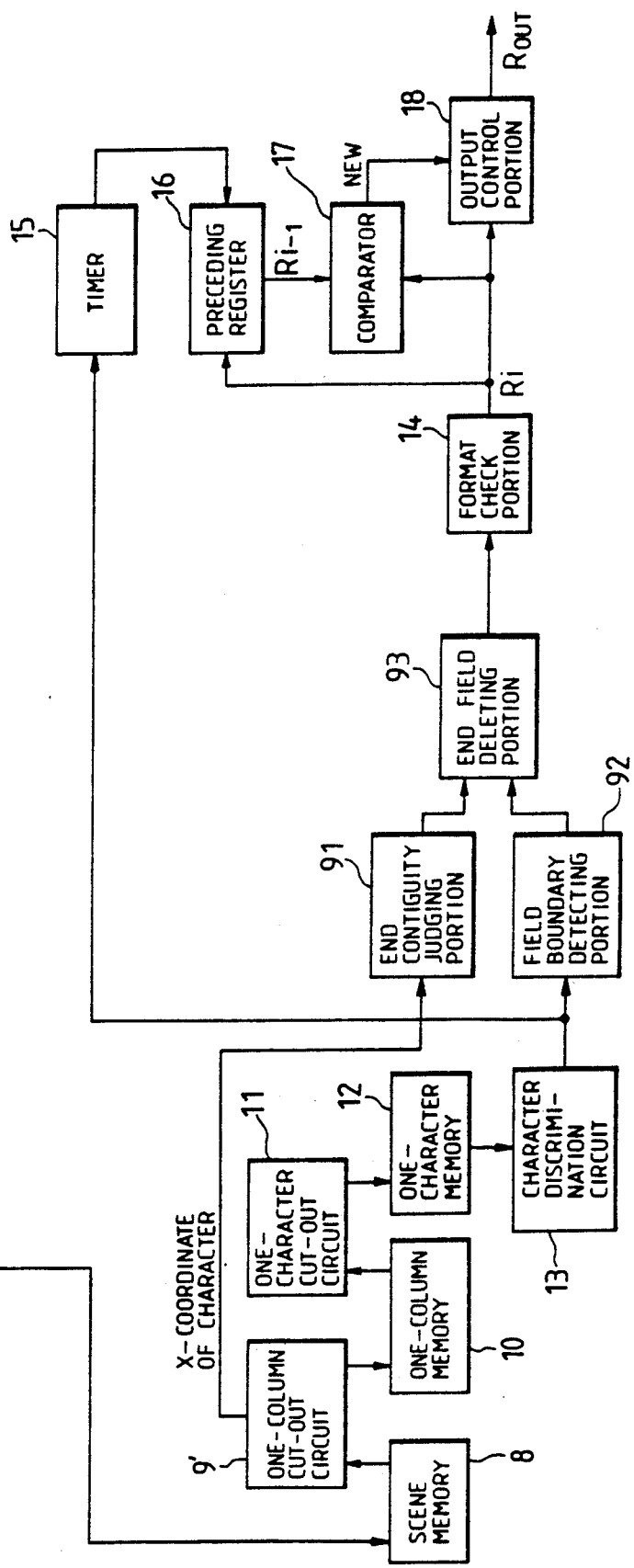
FIG. 10 is a diagram showing a second embodiment of the present invention.

A second embodiment according to the present invention is shown in FIG. 10, in which parts designated by the reference numerals 1 to 18 are the same as parts designated by like reference numerals in FIG. 9.

In FIG. 10 an end contiguity judging portion 91, a field boundary detecting portion 92 and an end field deleting portion 93 are shown as an example of the field selecting means 22 of FIG. 8.

The end contiguity judging portion 91 serves to judge from the x-coordinate of each recognized character whether the character is in contiguity with each end of the view range or not. The end contiguity judging portion 91 makes a decision that the character row contained in the view range of the image sensor is in contiguity with the left end of the view range, when the x-coordinate $X_L$ of left-end one of the recognized characters satisfies the following relation (2).

$$X_L \leq L_{th} \ldots \quad (2)$$

The end contiguity judging portion 91 makes a decision that the character row contained in the view range of the image sensor is in contiguity with the right end of the view range, when the x-coordinate $X_R$ of right-end one of the recognized characters satisfies the following relation (3).

$$R_{th} \leq X_R \ldots \quad (3)$$

In the relations (2) and (3), $L_{th}$ represents the x-coordinate of the second character from the left end of the view range, and $R_{th}$ represents the x-coordinate of the second character from the right end of the view range, each of $L_{th}$ and $R_{th}$ showing a threshold for judgment as to whether the field is in contiguity with each end of the view range. If there is no space character between the characters forming a field, any one of the relations (2) and (3) is established when the field overflows the view range at either end thereof. When either one of the relations (2) and (3) is established, the end contiguity judging portion 91 reports the fact to the end field deleting portion 93.

The field boundary detecting portion 92 searches field boundaries by reference to the result of character recognition to report the thus searched field boundaries and the result of character recognition to the end field deleting portion 93. In the case of FIG. 6(c), two field boundaries are located between "0" and "N" and between "0" and "Y".

When the end contiguity judging portion 91 makes a decision that the relation (2) is established, the end field deleting portion 93 deletes the recognized character row from the left end to the first field boundary. When the end contiguity judging portion 91 makes a decision that the relation (3) is established, the end field deleting portion 93 deletes the recognized character row from the right end to the first field boundary. Consequently, the end field deleting portion 93 sends the recognition result of the remainder to the format check portion 14.

Thus, the field perfectly contained in the view range is selectively taken out by the end contiguity judging portion 91, the field boundary detecting portion 92 and the end field deleting portion 93 and sent to the format check portion 14. The procedure after the format check portion 14 is the same as in the first embodiment of FIG. 9.

Third Embodiment

Figure 11:
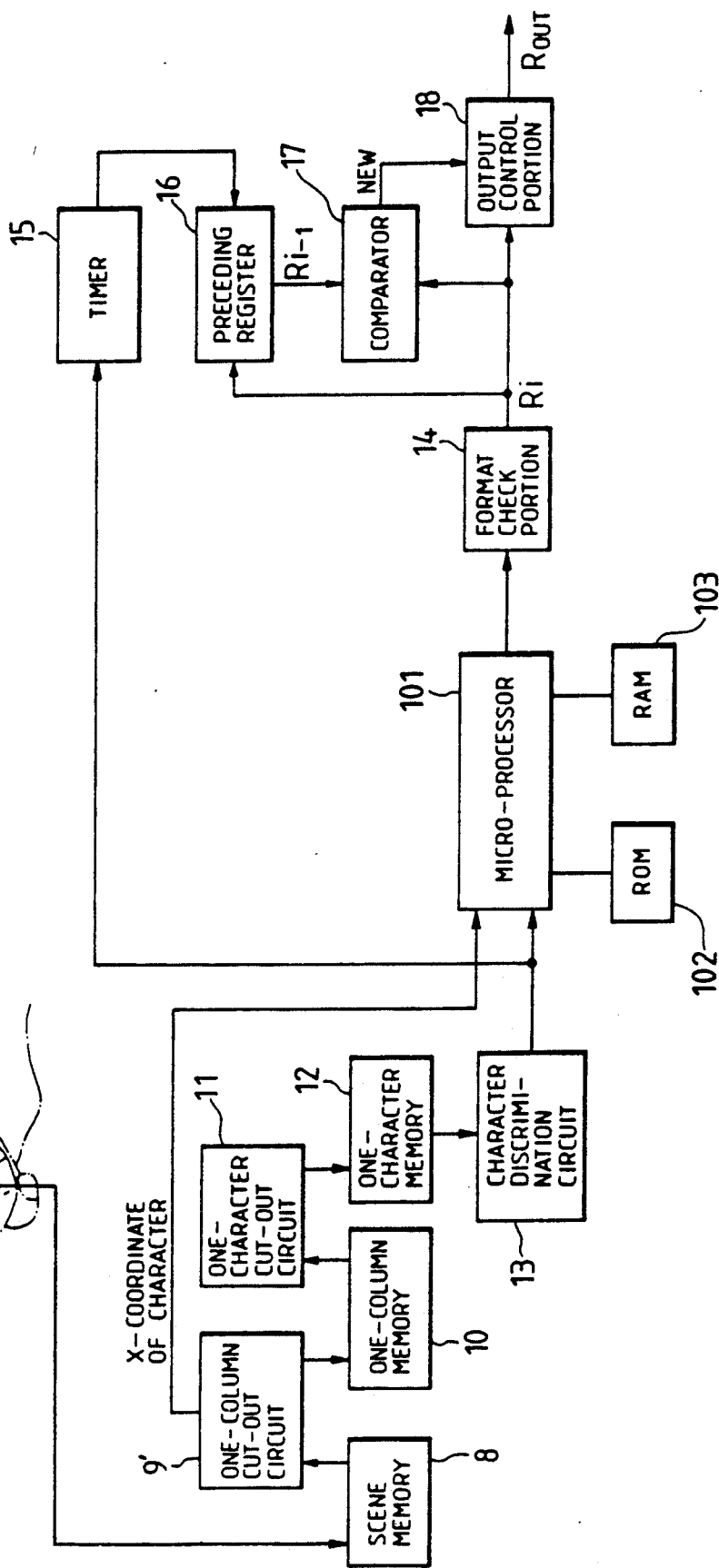
FIG. 11 is a diagram showing a third embodiment of the present invention.
Figure 12:
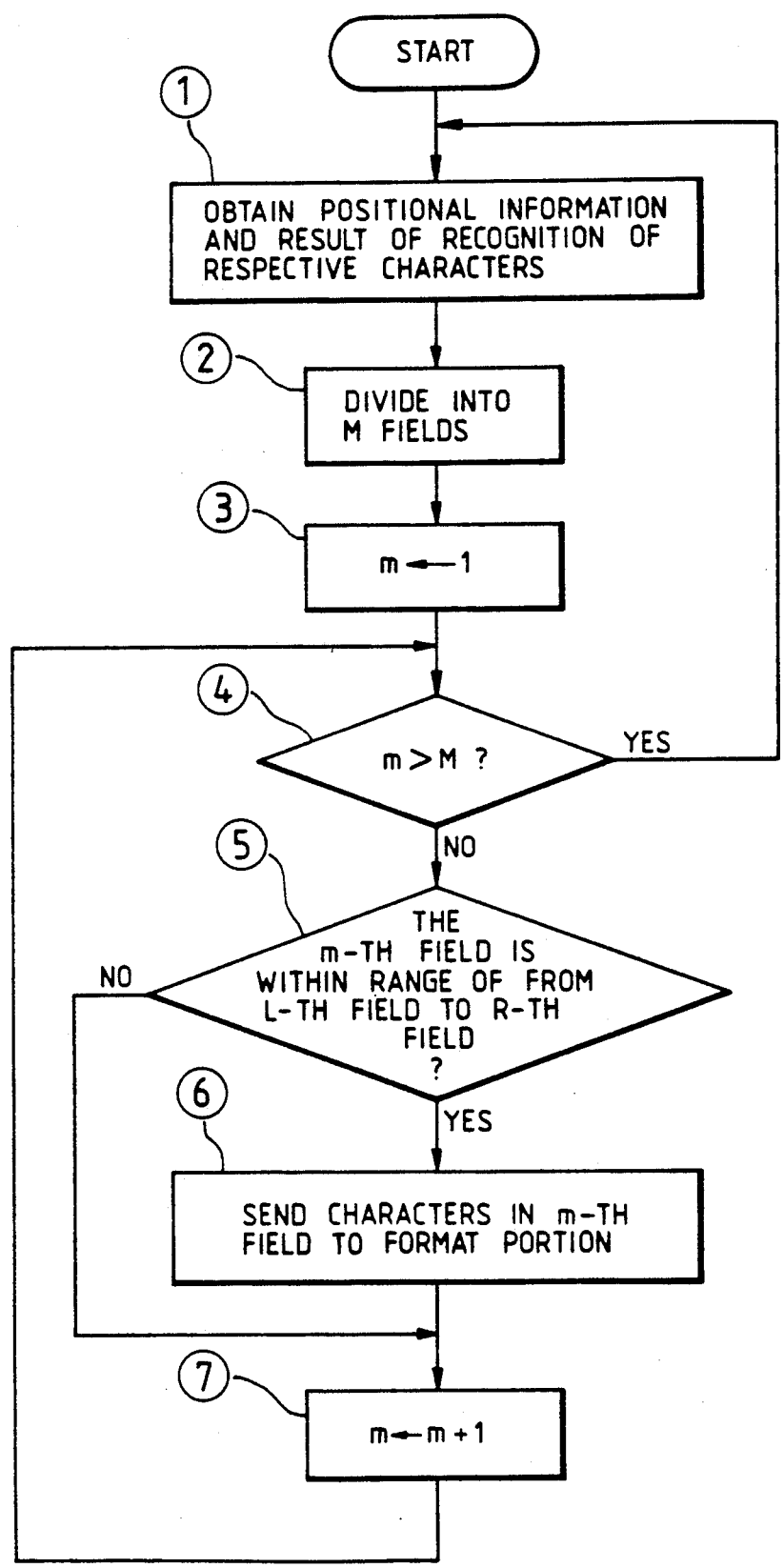
FIG. 12 is a flow chart of the processing by microprocessor in the third embodiment of the present invention.

An embodiment according to the present invention using a micro-processor is shown in FIG. 11, in which parts designated by the reference numerals 1 to 18 are the same as parts designated by like reference numerals in FIG. 9. In FIG. 11 the reference numerals 8 to 13 are shown as an example of the character recognizing means 21 of FIG. 8, the reference numeral 14 is shown as an example of the format check means 23, and the reference numerals 15 to 18 are shown as an example of the output judging means 24. The operation of parts designated by the reference numerals 1 to 18 is the same as described above in First Embodiment. The field selecting means 22 is performed by the processing by a micro-processor 101 using a RAM 103 on the basis of programs and constants stored in a ROM 102. FIG. 12 is a flow chart of the processing by the micro-processor.

The flow chart of FIG. 12 shows the case where the field selecting means of FIG. 9 is performed by microprocessor. In FIG. 12 the step ① shows the procedure for reading the recognition result and the x-coordinate of each character contained in the view range of the image sensor from the character recognizing circuit 13 and the one-column cut-out circuit 9'. The step ② shows the procedure for dividing the contents obtained in the step ① for every field. Assuming now that the number of fields divided in the step ② is M, the steps ③, ④ and ⑦ show the procedure for repeating the procedure shown by the steps ⑤ and ⑥. The step ⑤ shows the procedure for judging whether the m-th field as a target to be processed is perfectly contained in the view range or in other words whether the relation (1) is valid. If the relation (1) is valid, the characters of the field are sent to the format check portion 14 in the step ⑥. By the aforementioned procedure, fields being in contiguity with each end of the view range can be removed so that the remaining fields perfectly contained in the view range can be sent to the format check portion 14.

In the flow chart of FIG. 12, the field dividing portion 81 is performed by the procedure of the step ②, the field position judging portion 82 is performed by the procedure of the step ⑤, and the field take-out portion 83 is performed by the procedure of the step ⑥.

Fourth Embodiment

The third embodiment has been shown as the case where the same effect as in the first embodiment is attained by use of a micro-processor. The case where the same effect as in the second embodiment is attained by use of a micro-processor is shown as a fourth embodiment. In this embodiment, parts except the flow chart of the micro-processor are the same as in the third embodiment of FIG. 11.

Figure 13:
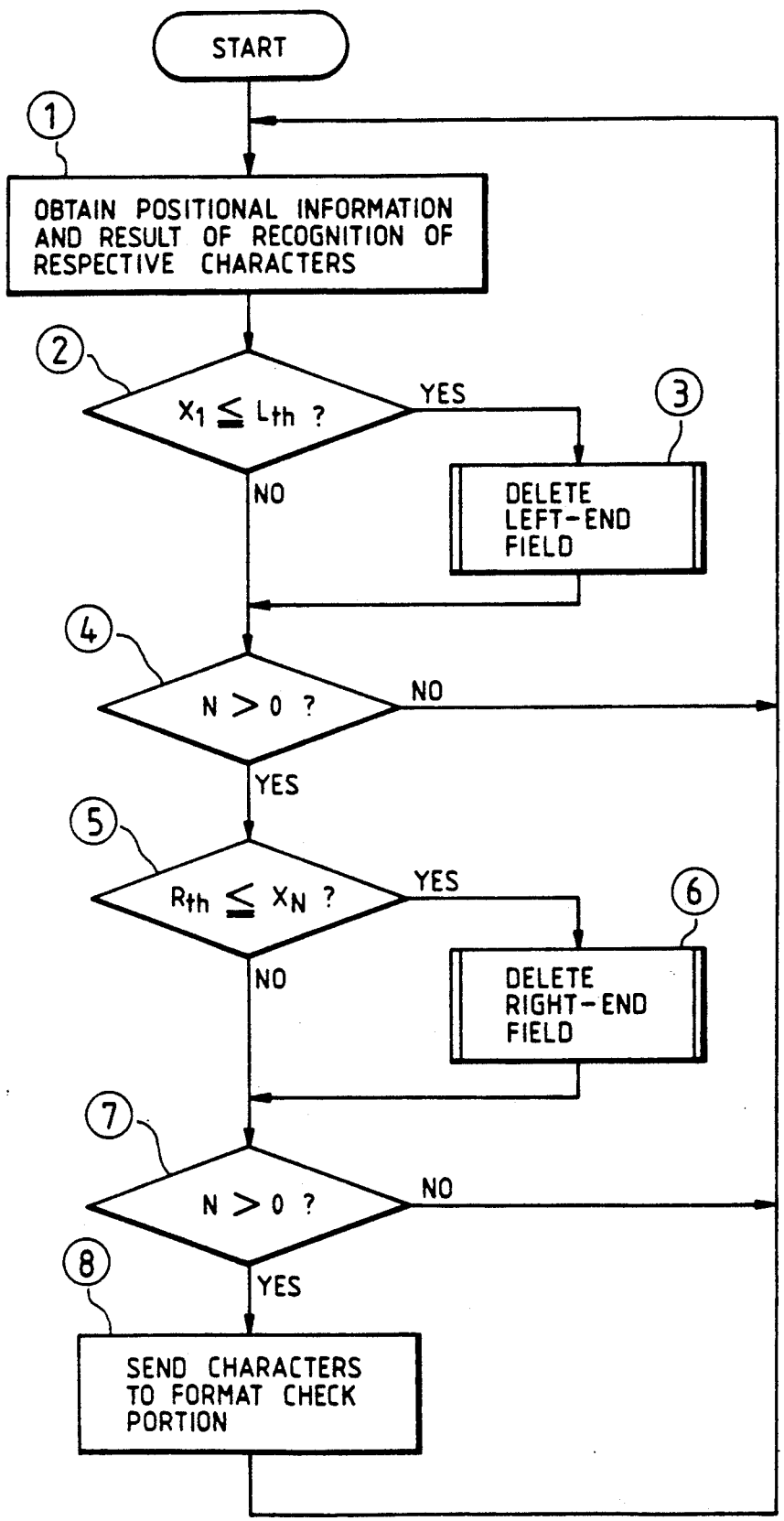
FIG. 13 is a flow chart of the processing by microprocessor in the fourth embodiment of the present invention.

FIG. 13 is a flow chart in the case where the field selecting means 22 is performed by a micro-processor. In FIG. 13 the step ① shows the procedure for receiving the character recognition result $C_I$ from the character recognizing circuit 13 and the x-coordinate $X_I$ of each character from the one-column cut-out circuit 9' (I=1, 2, ... N : Let the number of characters in the view range be N). The step ② shows the procedure for judging whether the relation (2) is valid for the x-coordinate $X_L$ of the left-end character. If the relation (2) is valid, the field in contiguity with the left end of the view range is deleted in the step ③. If the step ④ makes a decision that the remainder still exists after the procedure of the step ③, the judgment as to whether the relation (3) is valid for the x-coordinate $X_R$ of the right-end character is made in the step ⑤. If the relation (3) is valid, the field in contiguity with the right end of the view range is deleted in the step ⑥. Thus, unnecessary fields in contiguity with each end of the view range are deleted by the procedure of the steps ② to ⑥. If the step ⑦ makes a decision that the remaining fields exist, the characters of the remaining fields are sent to the format check portion 14 in the step ⑧.

Figure 14:
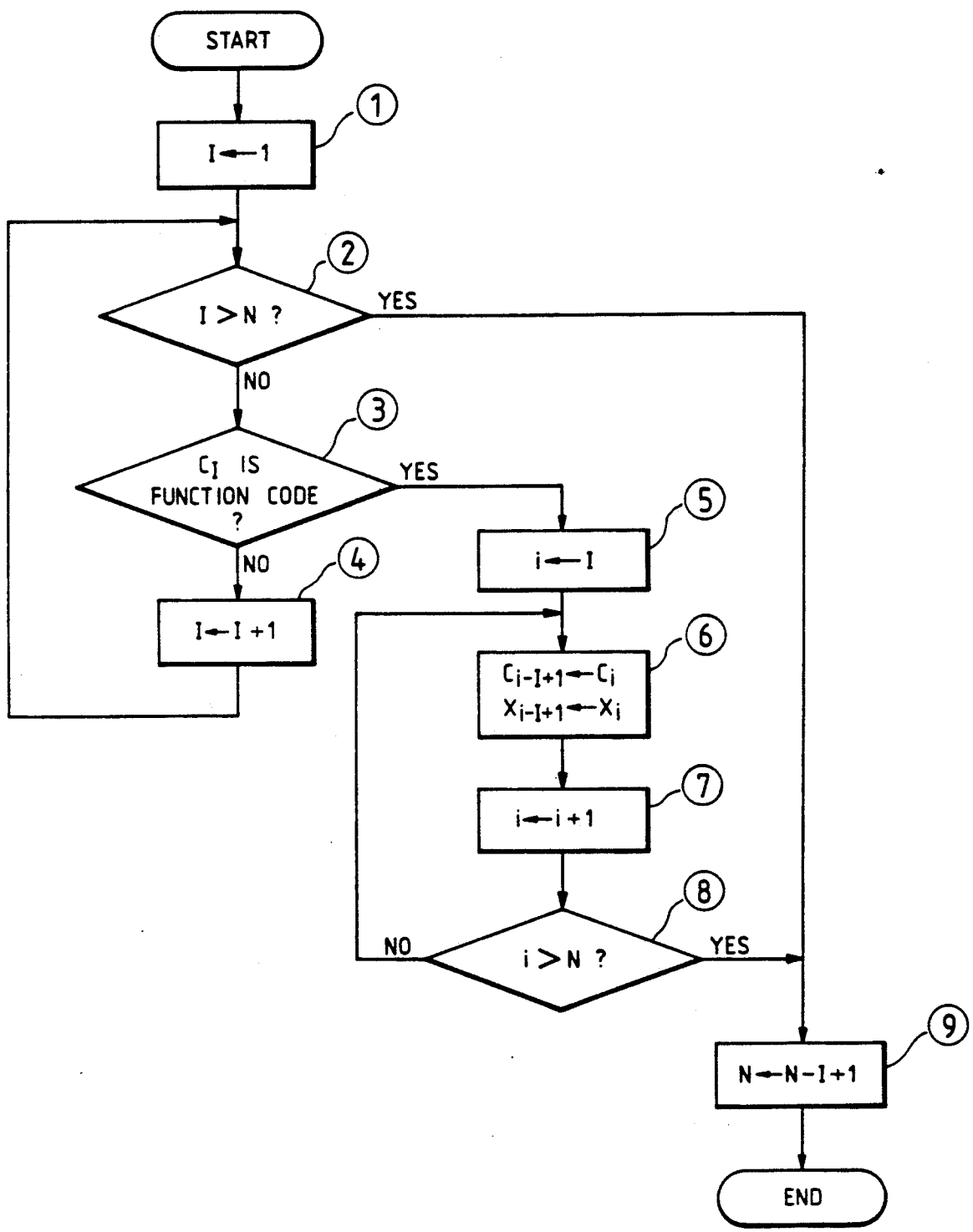
FIG. 14 is a detailed flow chart of left-end field deleting process.

FIG. 14 is a detailed flow chart of the left-end field deleting procedure ② of FIG. 13. In FIG. 14 the steps ①, ② and ④ show the repetition procedure for performing the judgment of the step ③ in the order from the left character. The step ③ shows the procedure for judging whether the character $C_I$ as a target is a function code or not. If $C_I$ is a function code, the left portion from $C_I$ is deleted by the procedure of the steps ⑤, ⑥, ⑦, and ⑧ because $C_I$ expresses the start of the next field. The step ⑨ shows the procedure for registering the number (N−I+1) of characters after deleting.

Figure 15:
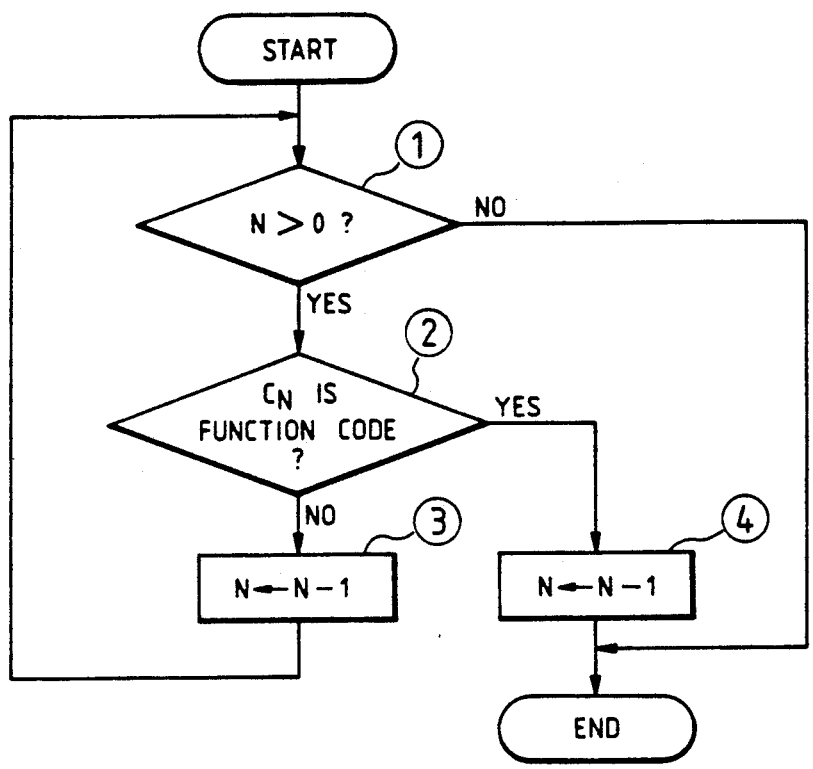
FIG. 15 is a detailed flow chart (I) of right-end field deleting process.

FIG. 15 is a detailed flow chart of the right-end field deleting procedure ⑥ of FIG. 13. In FIG. 15 the steps ① and ③ show the procedure of judgment of the step ② in the order from the right character. The step ② shows the procedure for judging whether the character $C_N$ as a target is a function code or not. If $C_N$ is a function code, the number (N−1) of characters after deleting of the right portion from $C_N$ is registered by the procedure of the step ④ because the $C_{N-1}$-th character is the last character of the field.

It is apparent from the above description that the end contiguity judging portion 91 of FIG. 10 is performed by the procedure of the steps ② and ⑤ of FIG. 13, the field boundary detecting portion 92 of FIG. 10 is performed by the procedure of the step ③ of FIG. 14 and the step ② of FIG. 15, and the end field deleting portion 93 of FIG. 10 is performed by the procedure of the steps ⑤ to ⑨ of FIG. 14 and the N subtrahend procedure of the step ③ and the N value resetting procedure of the step ④ of FIG. 15.

In the flow chart of FIG. 14, if the character in contiguity with the left end of the view range is a function code, the field in contiguity with the left end of the view range is not deleted. Accordingly, in this embodiment, the horizontal length of the view range of the image sensor can be established to be more than the maximum field length by one character at the least.

Figure 16:
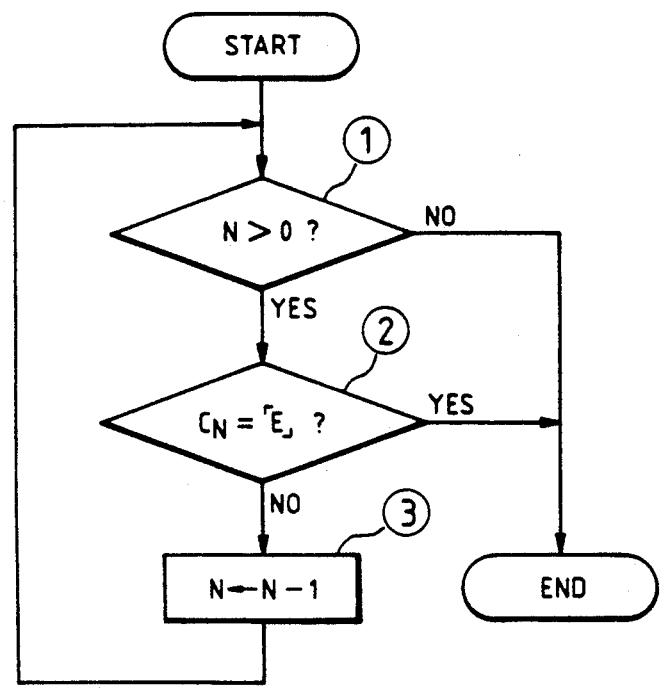
FIG. 16 is a detailed flow chart (II) of right-end field deleting process.

Although this embodiment has shown the case where one field is composed of a function code for expressing a field boundary and data characters, the invention is applicable to the case where one field includes other kinds of characters different from the function code of this embodiment if the method for judging the field boundary can be adjusted to the condition of establishing the field boundary. When, for example, a price tag on which the character of "E" is written at the end of each field is used, the procedure in the detailed flow chart of FIG. 16 can be used as the right-end field deleting procedure of the stage ⑥ of FIG. 13. In FIG. 16 the steps ① and ③ show the repetition procedure for performing the judgment of the step ② in the order from the right-end character in the view range. If the character sent to the step ② is "E", the repetition procedure is terminated on the consideration that "E" is a field boundary, so that the total number N of characters inclusive of "E" is established. If, in the judgment of FIG. 16, the character in contiguity with the right end of the view range is "E", the field in the contiguity with the right end of the view range is not deleted. In the case where the field in the price tag is selected by the procedure of FIGS. 14 and 15, the image sensor is designed to have a horizontal length enough to contain at least maximum field's characters.

Fifth Embodiment

Figure 17:
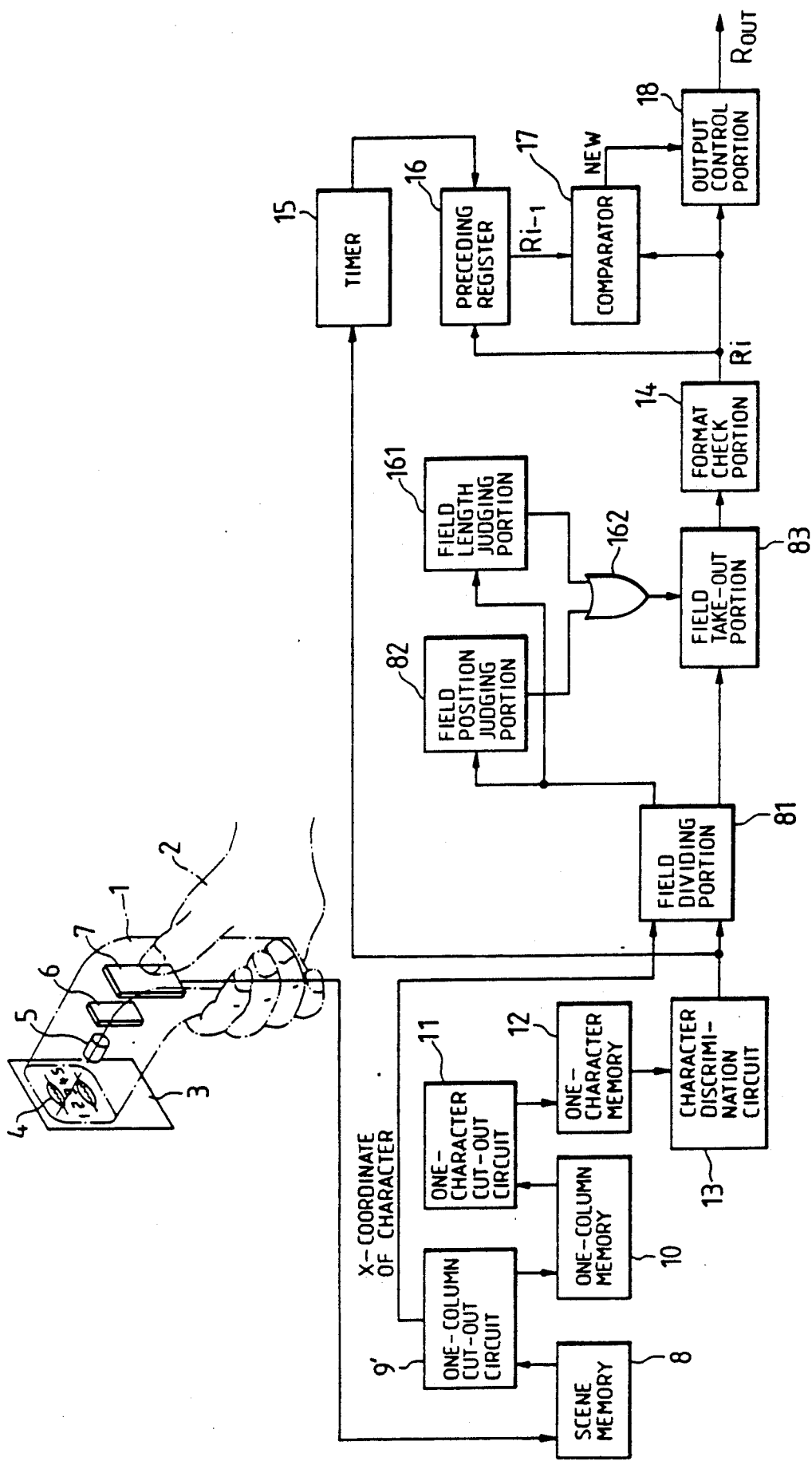
FIG. 17 is a diagram showing a fifth embodiment of the present invention.

In the first embodiment, the field which can be read must be less than the view range by two or more characters' length. Assuming now that the view range has 18 characters' length, the field satisfying the relation (1) is limited to 16 characters' length. It is simply a waste from the viewpoint of effective use of the view range that the field is limited to 16 characters' length in spite of 18 characters' length of the view range. Herein, to make it possible to read a longer field using the full length of the view range, an embodiment is shown in FIG. 17. The mode of proceeding of FIG. 17, except the field selecting means, is the same as in FIG. 9.

In FIG. 17 the reference numeral 161 designates a field length judging portion for judging whether the x-coordinate $X_L$ of the left-end character and the x-coordinate $X_R$ of the right-end character of the field taken out by the field dividing portion 81 satisfy the relation:

$$X_R\text{-}X_L > R_{th} - L_{th} - 2 \ldots \qquad (4)$$

in which $L_{th}$ and $R_{th}$ are the same as those of the relation (1).

When either of the two relations (1) and (4) respectively judged by the field position judging portion 82 and the field length judging portion 161 is valid, an OR gate 162 gives instructions to the field take-out portion 83 to send the field to the format check portion 14. In the case where the field is too short to satisfy the relation (4), the field is processed in the format check portion 14 only when the field is perfectly contained in the view range. In the case where the field is long enough to satisfy the relation (4), the field is processed in the format check portion 14 independent of the view range, so that the long field can be read.

In the case where the field satisfies the equation $X_R - X_L = R_{th} - L_{th} - 2$, it is however difficult to apply the scanner on the field so as to satisfy the relation (1). That is, $X_R = R_{th} - 1$ and $X_L = L_{th} + 1$. In practice, the condition of judgment by the relation (4) maybe slightly loosened as represented by the relation:

$$X_R - X_L > R_{th} - L_{th} - \epsilon \ldots \qquad (5)$$

in which for example is one-character length (e.g., 14).

Although the aforementioned embodiment has shown the procedure in the case where only one row can be contained in the view range, the invention is applicable to the case where the view range has a vertical length enough to contain a plurality of rows if format check can be carried out on fields taken out at every row in the same manner as described above.

Figure 18:
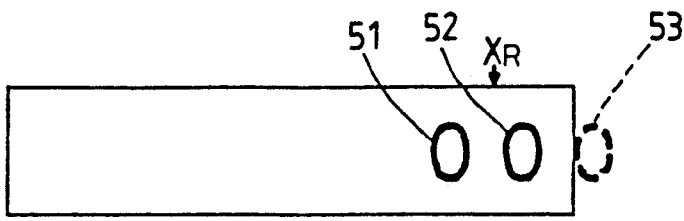
FIGS. 18a–18b are views for explaining a method for deciding $R_{th}$, $R'_{th}$ and $E_R$.
Figure 18:
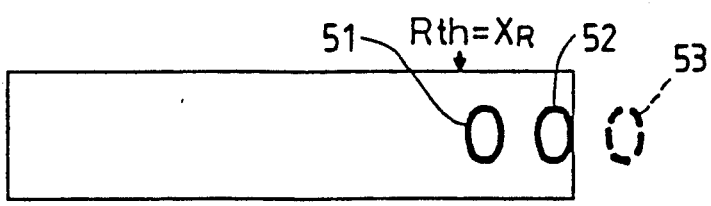
Figure 18:
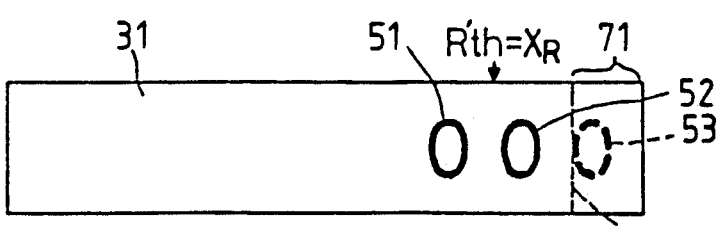
Figure 18:
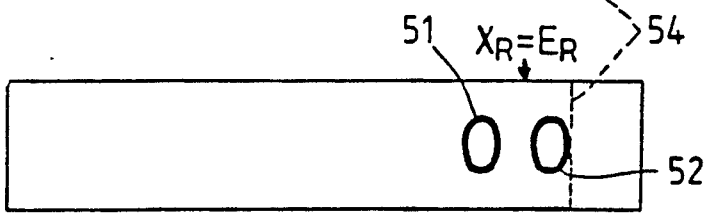
Figure 18:
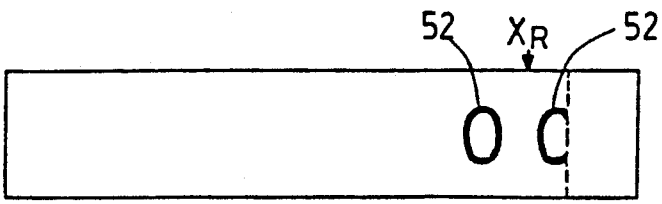
Figure 18:
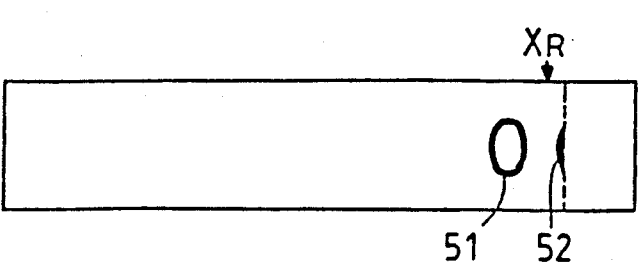

The method of determining $R_{th}$ in the relation (1) in the aforementioned first embodiment is described in detail with reference to FIG. 18. In FIG. 18(a) the right-end character which can be recognized is designated by the reference numeral 52. In FIG. 18(b) the character 52 cannot be recognized because the character is in contiguity with the right end of the view range. Accordingly, in FIG. 18(b) the right-end character which can be recognized is designated by the reference numeral 51. $R_{th}$ is determined so that, when a series of characters as designated by the reference numerals 51, 52 and 53 is partly (the reference numeral 53) out of the view range, $R_{th}$ coincides with the minimum x-coordinate of the right-end character which can be recognized. When the x-coordinate of the right-end character which can be recognized takes the minimum value, the next character 52 on the right side of the character 51 is just in contact with the right end of the view range as shown in FIG. 18(b). In short, the value of XR in FIG. 18(b) is equalized to $R_{th}$.

The optical character reader according to the first embodiment cannot recognize the character 52 of FIG. 18(b) being in contact with the end of the view range. Although it can be found on the picture image grasped by the image sensor that (a part of) the character touches the end of the view range, the information cannot be obtained as the result of recognition, so that the information cannot be used.

On such circumstances, the second aspect of the invention is provided. The purpose of the second aspect of the invention is to increase the effective reading width of the view range by using information that the character image is in contact with the end of the view range.

Figure 19:
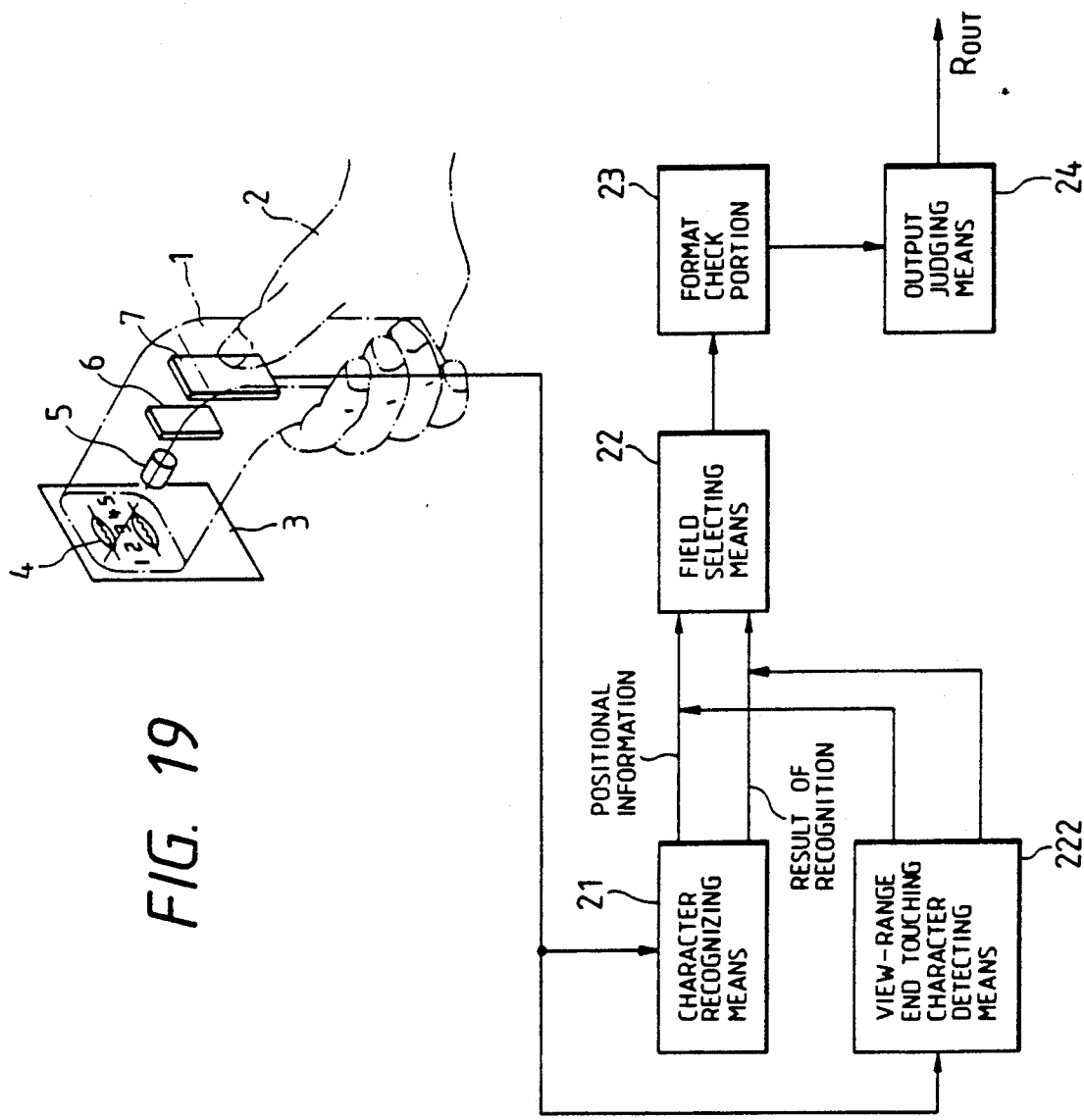
FIG. 19 is a diagram of an optical reader according to the second aspect of the present invention.

An arrangement according to the second aspect of the present invention is shown in FIG. 19, in which parts designated by the reference numerals 1 to 7 are the same as parts designated by like reference numerals in FIG. 9. It is necessary that the view range of the image sensor 6 has a horizontal length in which at least one-field's characters can be perfectly contained and a vertical length in which at least one character can be perfectly contained.

The reference numeral 222 designates a view end touching character detecting means for judging whether character image touches each row-directional end of the view range of the image sensor.

The reference numeral 21 designates a character recognizing means for recognizing each character in the picture image grasped by the image sensor and for sending out the positional information showing the position of the character in the view range and the result of recognition. The reference numeral 22 designates a field selecting means for selecting a field on the basis of the positional information and the recognition result and for sending out the recognition result of the field perfectly contained in the view range. The reference numeral 23 designates a format check means for judging whether the recognition result obtained by the field selecting means 22 is in accord with a predetermined format or not. The reference numeral 24 designates an output judging means for sending out the recognition result only once when the recognition result is in accord with the predetermined format.

When the scanner 1 is applied onto the subject 3 by hand 2, characters on the subject are illuminated by the light source 4. Then a picture image is formed on the image sensor 6 through the lens series 5 and converted into an electric signal expressing "white"/"black" by the controlling and binary encoding circuit 7.

The view end touching character detecting means 222 judges from the picture image grasped by the image sensor whether character image touching the end of the view range exists and, on the judgment, send out the information of existence and position of the character image. On the other hand, the character recognizing means 21 recognizes each character in the picture image and sends out the result of recognition and the positional information.

If unnecessary fields touching each end of the view range are partly contained in the view range, the field selecting means 22 deletes the unnecessary fields by reference to the recognition result or view end character detection result and the positional information obtained from the means 222 and 21 so that the recognition result of a necessary field perfectly contained in the view range is sent to the format check means 23.

If the field obtained from the means 22 is in accord with a predetermined format, the recognition result is sent out only once via the format check means 23 and the output judging means 24.

Sixth Embodiment

Figure 20:
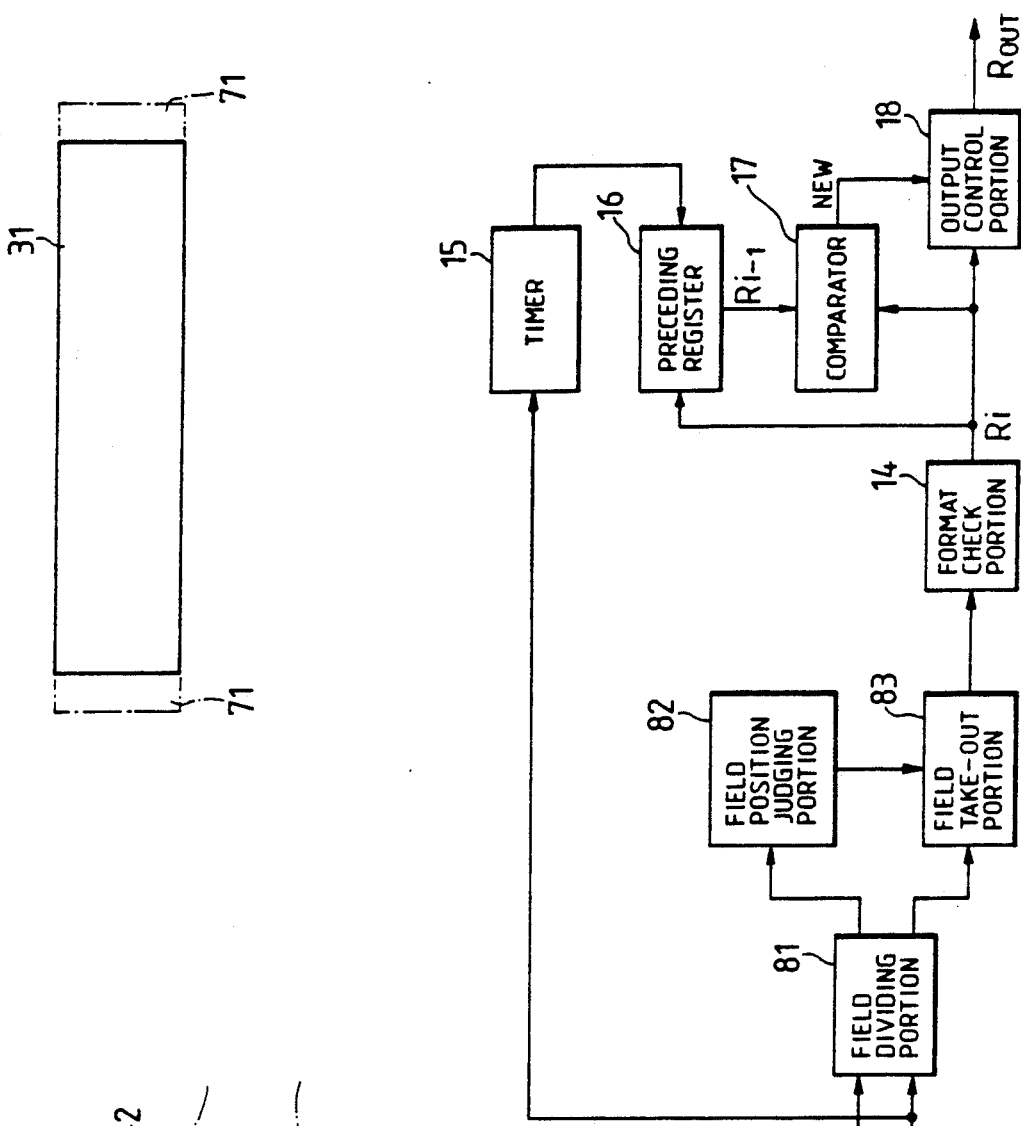
FIG. 20 is a diagram showing a sixth embodiment of the present invention.

An embodiment according to the second aspect of the present invention is described with reference to FIG. 20, in which parts designated by the reference numerals except the reference numeral 261 are about the same as parts designated by like reference numerals in FIG. 19. The view range of the image sensor 6 must have a horizontal length enough to contain all characters of the longest field perfectly. As occasion demands, the horizontal length of the view range may be more than maximum one-field length by two-characters' length, in order to put one field length by two-characters' length. In order to put one field in the view range with ease, it is preferable that the view range has enough large size both horizontally and vertically. In FIG. 20, the view range is established to have about 16 characters' horizontal length (11 characters as maximum one-field's length +5 characters) and about 3 characters' vertical length. In FIG. 20 the reference numerals 8 to 13 are shown as an example of the character recognizing means 21 of FIG. 19. The format check portion 14 is shown as an example of the format check means 23 of FIG. 19. The reference numerals 15 to 18 are shown as an example of the output judging means 24 of FIG. 19. The reference numerals 81 to 83 are shown as an example of the field selecting means 22 of FIG. 19.

Figure 21:
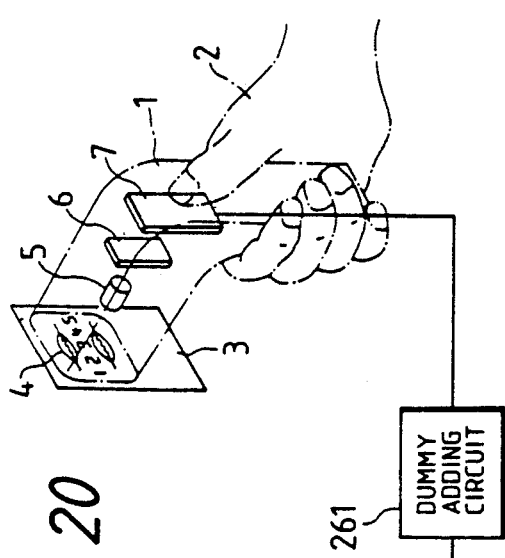
FIG. 21 is a view for explaining dummy area.

When the scanner 1 is applied onto the subject 3 by hand 2, a character image on the subject 3 is grasped by the image sensor. The controlling and binary encoding circuit 7 makes two-valuing of the output signal of the image sensor. A dummy adding circuit 261 serves to add dummy signal (one-character's "white") to both sides of the view range of the image sensor as shown in FIG. 21. The picture image inclusive of the dummy area is stored in the scene memory 8. The dummy adding circuit 261 is shown as an example of the view end touching character detecting means 222 of FIG. 19. Each character, inclusive of dummy component, stored in the scene memory 8 is recognized by the character recognizing circuit 13.

The field dividing portion 81 receives the result of character recognition from the character recognizing circuit 13 and the x-coordinate of the character from the one-column cut-out circuit 9'.

The field dividing portion 81 serves to divide the character recognition result obtained from the character recognizing circuit 13 for every field. In the case of the price tag of FIG. 6, one field is composed of a function code and data characters following the function code. When a certain function code exists in the recognition result, the function code shows the top of the field. On the basis of this fact, the field dividing portion serves to divide the result of character recognition and the x-coordinate of the character as a counterpart thereto for every field.

The field position judging portion 82 serves to judge whether the x-coordinate $X_L$ of the left-end character and the x-coordinate $X_R$ of the right end character in one field satisfy the relation:

$$L'_{th} < X_L \text{ and } X_R < R'_{th} \ldots \quad (6)$$

in which $L'_{th}$ and $R'_{th}$ show thresholds for judgment as to whether the field is in contiguity with each end of the view range In the following the case of $R'_{th}$ is described with reference to FIG. 18. $R'_{th}$ is determined so that, when a series of characters as designated by the reference numerals 51, 52 and 53 is partly (the reference numeral 53) out of the view range, $R'_{th}$ coincides with the minimum x-coordinate of the right-end character which can be detected. Herein, the right-end character which can be detected means the character 52 in FIGS. 18(c), 18(d), 18(e) and 18(f). Accordingly, the minimum x-coordinate of the character 52 is $X_R$ in the case of FIG. 18(c). The term "can be detected" does not always mean "can be recognized". That is, the term means "the existence of (a part) of the character can be found in some way". In the case of FIG. 18(c), the character 52 can be correctly recognized because it is out of contact with the right end 54 of the view range of the image sensor. In the case of FIG. 18(d), the result of recognition of the character 52 is not always correct because the character 52 is in contact with the right end 54 of the view range of the image sensor so that a part of the character 52 out of the view range cannot be detected. However, the one-column cut-out circuit 9' serves to cut out the character inclusive of the dummy area 71, so that some recognition result, inclusive of recognition impossibility and misreading, can be obtained from the character recognizing circuit 13. In the cases of FIGS. 18(e) and 18(f), some recognition result can be obtained from the character recognizing circuit 13 in the same manner as in the case of FIG. 18(d), though the recognition result may be incorrect (in particular, in the case of FIG. 18(e), the possibility of misreading as "C" is most). The border case as to whether correct recognition result is obtained or not is the case of FIG. 18(d) in which the character 52 is just in contact with the right end 54 of the view range. In FIG. 18(d) the x-coordinate of the character 52 is represented by $E_R$. Concerning the left end of the view range, $L'_{th}$ and $E_L$ can be determined in the same manner as shown in FIG. 18.

The field dividing portion 81 serves to divide for every field the recognition result and the x-coordinate of each character obtained from the character recognizing circuit 13. In the case where some character touches either end of the image sensor, or in other words, in the case where the x-coordinate of the character does not satisfy the following relation (7), the recognition result can be handled as being impossible of recognition because it is incorrect.

$$E_L < X < E_R \ldots \quad (7)$$

In the field dividing portion 81, the character impossible of recognition is handled as a part of adjacent field to the character.

Only when the field position judging portion 82 makes a decision that the field satisfies the relation (6), the field take-out portion 83 sends the recognition result of the field to the format check portion 14. Although unnecessary fields not satisfying the relation (6), too, are sent from he field dividing portion 81 to the field take-out portion 83, the unnecessary fields are deleted in the field take-out portion 83, so that they are not sent to the format check portion 14.

The format check portion 14 performs format check of the field sent from the field take-out portion 83. If the field is in accord with a predetermined format, the format check portion 14 sends the field to the preceding register 16, the comparator 17 and the output control portion 18.

The timer 15, the preceding register 16, the comparator 17 and the output control portion 18 are shown as an example of the output judging means 24 of FIG. 19. The procedure comprising the steps of: recognizing each character in the view range with scanning by the image sensor; taking out a field perfectly contained in the view range; and performing format check of the field taken out, is repeated. However, the result of recognition is sent out only once, in the case where the same field is repeatedly obtained as the result of format check by applying the scanner on the same field.

The production of the dummy area can be attained by adding the dummy area when the picture image is written on the scene memory 8 as shown in FIG. 20 or can be attained by adding the dummy area when the picture image is read from the scene memory by the one-column cut-out circuit 9'. In practice, the dummy area may be added to the picture image grasped by the image sensor at each side of the picture image. Alternatively, the dummy area may be established by the procedure in which each end portion of the picture image grasped by the image sensor is changed to "white".

Seventh Embodiment

A seventh embodiment according to the present invention is shown in FIG. 22, in which parts designated by the reference numerals 1 to 18 are the same as parts designated by like reference numerals in FIG. 9. In FIG. 22 the reference numerals 281 and 282 designate a left-end black pixel detecting portion and a right-end black pixel detecting portion for detecting the existence of black pixel in the left and right ends of the view range, respectively. This embodiment uses the fact that, when some character touches an end of the view range, at least one black pixel exists in the end of the view range.

The operation of the portions 281 and 282 is described with reference to FIG. 23. FIG. 23(a) shows the range of detection of the existence of black pixel in each of the left and right ends. The portions 281 and 282 judge whether at least one black pixel exists in the respective ranges 91 and 92 or not and, on the judgment that at least one black pixel exists, make a decision that some character touches the end of the view range. Assuming now that character "0" touches the right end of the view range, at least one black pixel exists in the range 92 and, accordingly, the portion 282 makes a decision that some character touches the right end of the view range. When the portions 281 and 282 judge that some character touches the end of the view range, the portions 281 and 282 report the fact to the field dividing portion 81, respectively. The report to the field dividing portion approximately means that some character impossible of recognition exists in the end of the view range.

In FIG. 23(a) the ranges 91 and 92 cover the (Y-direction) whole height. To make the operation more accurate, it is preferable that the ranges of black pixel detection are limited to the height in which characters exist. The limited detection ranges are shown in FIG. 23(b). In FIG. 23(b) the reference numeral 93 designates the range of detection as to whether at least one black pixel exists in the left end of the view range or not. The detection range 93 is from the upper end of the left-end character as represented by the Y-coordinate $Y_L$ to the lower end thereof. Because the height of the detection range 93 is limited to the character height compared with the case of the range 91, the influence of black pixels produced by a stain 95 at the upper of the character can be eliminated. The reference numeral 94 designates the range of detection as to whether at least one black pixel exists in the right end of the view range or not. The detection range 94 is limited from the upper end of the right-end character as represented by the Y-coordinate $Y_L$ to the lower end thereof. To control the Y-direction detection ranges of the left-end black pixel detecting portion 281 and the right-end black pixel detecting portion 282 corresponding to the Y-coordinates $Y_L$ and $Y_R$ of the left-end and right-end characters, the Y-coordinates of the character cut out by the one-character cut-out circuit 11 is given.

Eighth Embodiment

Figure 24:
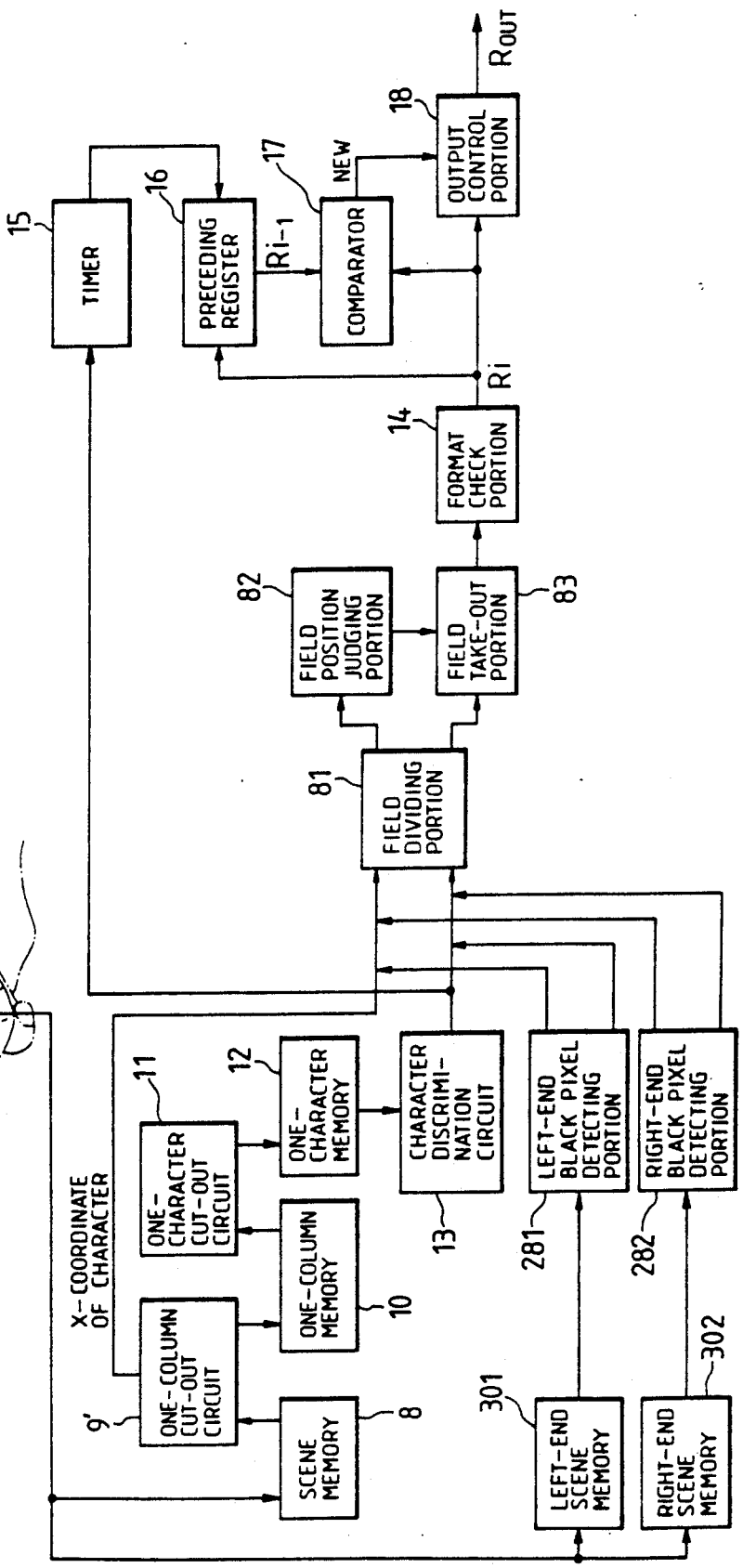
FIG. 24 is a diagram showing an eighth embodiment of the present invention.

As described above, the black pixel detecting portions in the seventh embodiment judge the existence of a black pixel by using pixels at the ends of the view range of the image sensor used for character recognition. For the purpose of the second aspect of the invention, so high resolution power/sensitivity as sharply judging the figure of the character is not required. Accordingly, it is needless that the characteristic of pixels of the image sensor used for the black pixel detecting portions is high. FIG. 24 shows the case where black pixel detection is carried out by using pixels different from the pixels of the image sensor used for character recognition in the characteristic.

Figures 25, 26:
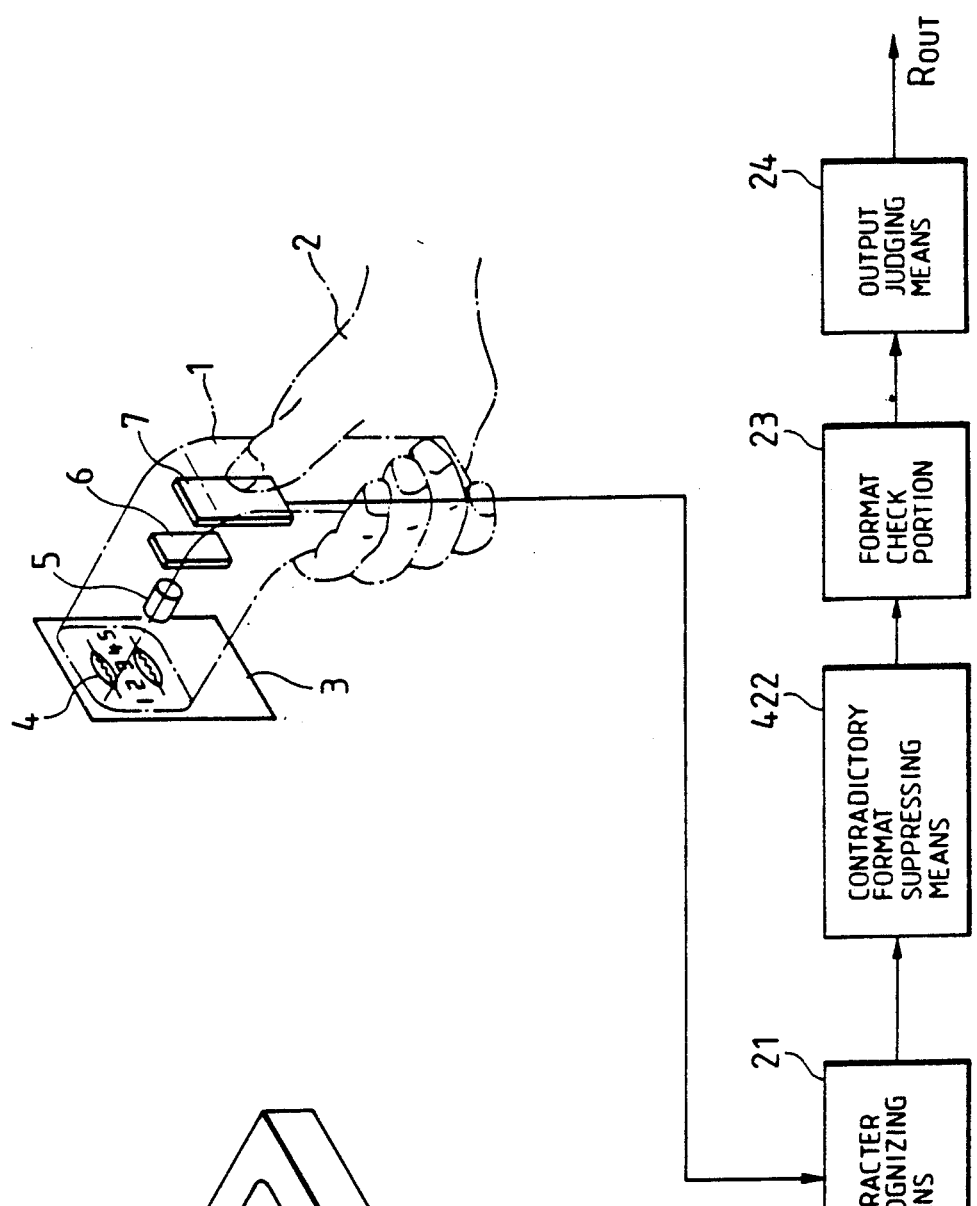
FIG. 25 is an enlarged perspective view of the image sensor.
FIG. 26 is a diagram of an optical reader according to the third aspect of the present invention.

In FIG. 24, pixels on the image sensor 6 are classified into three regions as follows: the region used for the left-end black pixel detecting portion, the region used for character recognition, and the region used for the right-end black pixel detecting portion (FIG. 25). The output of the image sensor is converted to binary signal of "white"/"black" by the controlling and binary encoding circuit 7. The binary signal is stored in one memory selected from the left-end scene memory 301, the scene memory 8 and the right-end scene memory 302 corresponding to the respective pixel region. The procedure of character recognition using the scene memory 8 is the same as in the case of FIG. 22. The left-end pixel detecting portion 281 judges by using the left-end scene memory 301 whether at least one pixel exists in the left end of the view range or not. The right-end pixel detecting portion 281 judges by using the right-end scene memory 302 whether at least one pixel exists in the right end of the view range or not. In FIG. 24 the procedure after the scene memory 8 and the method of use of the result of judgment by the left-end black pixel detecting portion 281 and right-end black pixel detecting portion 282 are the same as in the case of FIG. 22.

The image sensor used in FIG. 24 is as follows. To realize the arrangement of FIG. 24, an image sensor having pixels for character recognition and pixels as adjacent to both ends thereof may be provided newly. However, use of the conventional image sensor in this embodiment is made possible by changing the method of use thereof. In the conventional image sensor, the case where side pixels among the pixels prepared on the IC chip cannot be used occurs frequently. The reason is that the characteristic of side pixels is often remarkably different from the characteristic of central pixels in the view range. In such cases, only the output of central pixels is used in disregard of the output of side pixels, though all pixels inclusive of side pixels are scanned by the image sensor. However, the present invention is applicable to the case where the characteristic of side pixels may be inferior to the characteristic of other pixels, because the respective black pixel detection portion in the invention merely serves to detect the existence of black pixel. According to the invention, the output signal of side pixels conventionally disregarded can be used by the respective black pixel detecting portion.

An arrangement according to the third aspect of the present invention is shown in FIG. 26, in which parts designated by the reference numerals 1 to 7 are the same as parts designated by like reference numerals in FIG. 1. It is necessary that the range of view of the image sensor 6 has a horizontal length in which at least one-field's characters can be perfectly contained and a vertical length in which at least one character can be perfectly contained.

The reference numeral 21 designates a character recognizing means for recognizing each character in the picture image grasped by the image sensor. The reference numeral 422 designates a contradictory format suppressing means for judging whether the result of recognition is contradictory to a predetermined format or not and for substantially suppressing the reading of characters after the judgment that the result of the recognition is contradictory to the predetermined format. While the reading is not suppressed, the result of recognition obtained from the means 21 is checked by a format check means 23. The format check means 23 is provided for judging whether the result of recognition is in accord with a predetermined format. The reference numeral 24 designates an output judging means for sending out the recognition result $R_{OUR}$ only once with respect to one reading target when the recognition result is in accord with the predetermined format.

When the scanner 1 is applied onto the subject 3 by hand 2, characters on the subject are illuminated by the light source 4. Then a picture image is formed on the image sensor 6 through the lens series 5 and converted to electric signal expressing "white"/"black" by the control two-valuing circuit 7.

Each character in the picture image grasped by the image sensor is recognized by the character recognizing means 21, so that the recognition result is obtained.

If the recognition result is contradictory to the predetermined format, the reading of characters after such judgment is suppressed by the contradictory format suppressing means 422. When the recognition result a being in accord with the predetermined format is obtained before the suppression of reading, the recognition result is sent out via the format check means 23 and output judging means 24.

Ninth Embodiment

Figure 27:
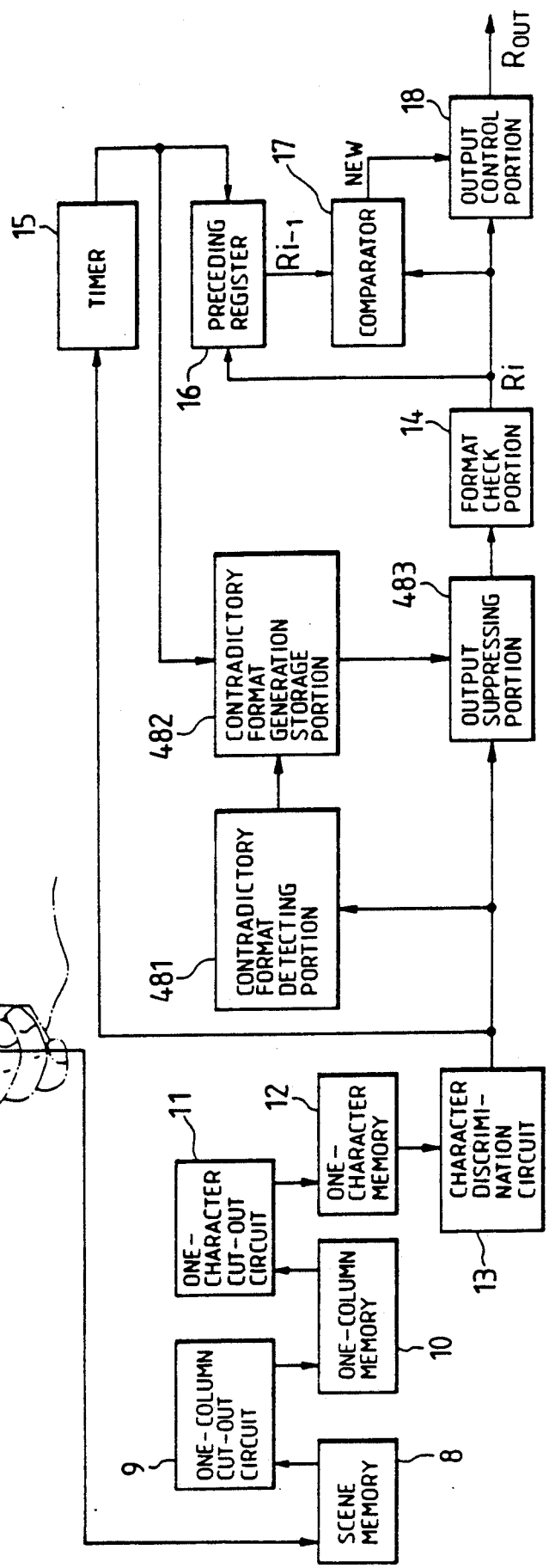
FIG. 27 is a diagram showing a ninth embodiment of the present invention.

A ninth embodiment according to the present invention is shown in FIG. 27, in which parts designated by the reference numerals 1 to 18 are the same as parts designated by like reference numerals in FIG. 1. In FIG. 27 the reference numerals 8 to 13 are shown as an example of the character recognizing means 21, the reference numerals 481 to 483 are shown as an example of the contradictory format suppressing means 422, and the reference numerals 15 to 18 are shown as an example of the output judging means 24.

The contradictory format detecting portion 481 serves to examine whether the recognition result obtained from the character recognizing circuit 13 is contradictory to the predetermined format or not. The contradictory format generation storage portion 482 serves to store the fact that a contradictory format has been generated and detected by the contradictory format detecting portion 481, and to keep the storage of the fact till the exchange of subjects 3 is detected by the timer 15. Just after power supply is turned on, the portion 482 is in an initial state in which the contradictory format generation is not stored yet. The output suppressing portion 483 sends the recognition result obtained from the character recognizing circuit 13 to the format check portion 14 while contradictory format generation is not stored in the contradictory format generation storage portion 482. On the other hand, the portion 483 does not send the recognition result obtained from the character recognizing circuit 13 to the format check portion 14 while contradictory format generation is stored in the contradictory format generation storage portion 482.

The operation in reading of a row is as follows. The operation is described in the case where recognition results as shown in FIG. 4 are obtained in the order of ($b_1$), ($b_2$) and ($b_3$). The content checked by the contradictory format detecting portion 481 is, for example, "the recognition result is contradictory to the predetermined format when some alphabetical character appears within the 10 characters' range to right from "C" without any rejection". The recognition result ($b_1$) "?" is not contradictory to the predetermined format because it expresses rejection. Further, the results ($b_2$) and ($b_3$) are out of accord with the condition of judgment of the contradictory format detecting portion 481. Because the results ($b_1$), ($b_2$) and ($b_3$) are not suppressed by the output suppressing portion 483, all of the results are sent to the format check portion 14 as in the conventional manner and, consequently, one ($b_2$) of the results is sent out from the output control portion 18.

The operation in the case where recognition results are obtained in the order of (b) and (c) shown in FIG. 7 is as follows. The recognition result (b) is in accord with the aforementioned condition of judgment because the result (b) includes some alphabetical character appearing within the 10 characters' range to right from "C" without any rejection. Therefore, the contradictory format detecting portion 481 detects the generation of contradictory format. The fact is stored in the contradictory format generation storage portion 482, so that the recognition result (b) is not sent to the format check portion 14 because of the suppression by the output suppressing portion 483. Though the recognition result (c) is obtained after that, the recognition result (c) is suppressed by the output suppressing portion 483 so that the result (c) cannot reach the format check portion 14 because the contradictory format generation has been stored in the contradictory format generation storage portion 482. Accordingly, the optical character reader according to this embodiment differs from the conventional optical character reader in the point that the recognition result (c) is never sent out. The suppression is continued till the contradictory format generation storage portion 482 is initialized in response to detection of the exchange of subjects by the timer 15. In other words, just after the scanner is once separated from the subject, it becomes possible to read such a character row as having a correct format again.

Although this embodiment has shown the case where the output of the timer 15 is used for initialization of the contradictory format generation storage portion 482, it is a matter of course that the invention is not limited to the specific embodiment and that the same function can be attained by other means for detecting the exchange of subjects. For example, the output of a sensor provided at the top end of the scanner for the purpose of detecting the access of a subject may be used. Although this embodiment has shown the case where the output suppressing portion 483 is arranged to suppress the output of the character recognizing circuit 13 to thereby suppress substantially character recognition, the invention is applicable to the case where the character recognizing procedure designated by the reference numerals 8 to 13 may be stopped by using the output of the contradictory format generation storage portion 482 if the exchange of subjects can be detected independent of the output of the character recognizing circuit 13.

Tenth Embodiment

Although the ninth embodiment has shown the case where the output suppressing portion 483 is disposed in front of the format check portion 14, the invention is also applicable to the case where the order is reversed. Although the ninth embodiment has shown the case where the scanner must be once separated after the detection of contradictory format generation, the invention is applicable to the case where reading is automatically resumed when contradictory format generation is not detected for a predetermined time. Although the ninth embodiment has shown the case where format check is made for a single format, the invention is applicable to the case where format check is made for a plurality of formats. A tenth embodiment improved in these points is shown in FIG. 28.

Figure 28:
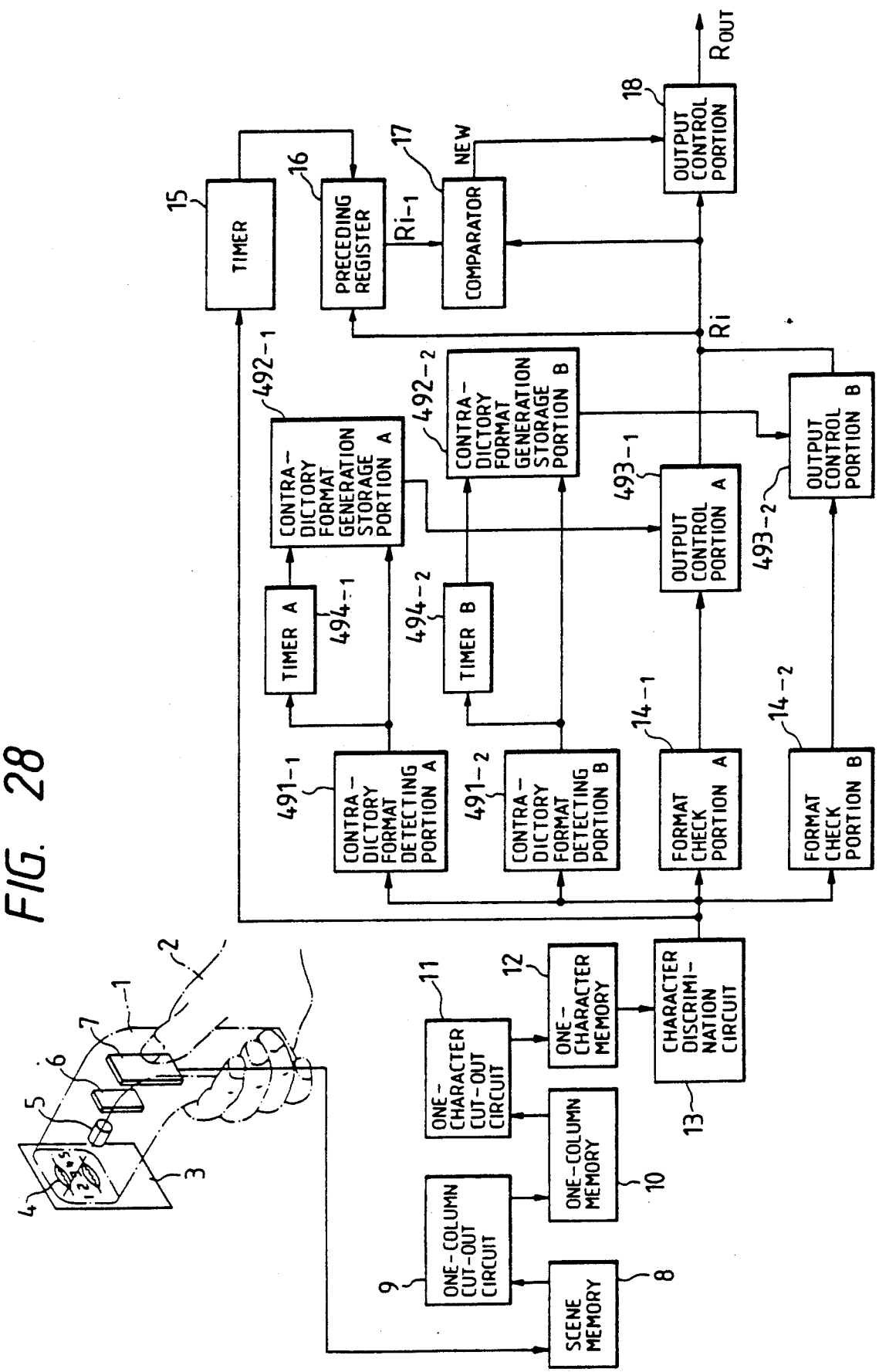
FIG. 28 is a diagram showing a tenth embodiment of the present invention.

In FIG. 28 parts designated by the reference numerals 1 to 18 are the same as parts designated by like reference numerals in FIG. 1, except that the format check portion A $14_{-1}$ and the format check portion B $14_{-2}$ perform format check for different formats. For example, the format check portion A $14_{-1}$ performs format check for a standard JIS price tag format and, on the other hand, the format check portion B $14_{-2}$ performs format check for an ISBN code format. It is now assumed that a format for reading the price tag of FIG. 5(a) is registered in the format check portion A $14_{-1}$ and another format for reading a row such as "C1234Y123E" (the row composed of "C", four numerical characters, "Y", one or more numerical characters to eight characters, and "E") is registered in the format check portion B $14_{-2}$.

The conditions of judgment as to whether the recognition result is contradictory to a predetermined format are registered in the contradictory format detecting portion A $491_{-1}$ and contradictory format detecting portion B $491_{-2}$ corresponding to the aforementioned formats, respectively.

If any one of the following conditions is valid, the contradictory format detecting portion A $491_{-1}$ makes a decision that the recognition result is contradictory to the format.

* Some alphabetical character appears within the 10 characters' range to right from "C" without any rejection,
* Some alphabetical character appears within the 10 characters' range to right from "N" without any rejection, and
* Some alphabetical character appears within the 6 characters' range to right from "Y" without any rejection.

On the other hand, the contradictory format detecting portion B $491_{-2}$ makes a decision that the recognition result is contradictory to the format, if any one of the following conditions is valid.

* Five or more numerical characters are continued to the right of "C" without any rejection, and
* Nine or more numerical characters are continued to the right of "Y" without any rejection.

The timer A $494_{-1}$ and timer B $494_{-2}$ serve to initialize the contradictory format generation storage portion A $492_{-1}$ and contradictory format generation storage portion B $492_{-2}$ if the contradictory format detecting portion A $491_{-1}$ and contradictory format detecting portion B $491_{-2}$ cannot detect contradictory format generation for a predetermined time, respectively.

The operation in this embodiment is as follows. It is now assumed that the row of "C1234Y123E" is read. When the recognition result of "C1234Y123E" is obtained from the character recognizing circuit 13, the contradictory format detecting portion A $491_{-1}$ makes a decision that the result is contradictory to the format. The decision is stored in the contradictory format generation storage portion A $492_{-1}$, so that the output control portion A $493_{-1}$ suppresses the output of the signal sent from the format check portion A $14_{-1}$. However, there is no actual harm in suppressing the output of the signal from the format check portion A $14_{-1}$, because the row originally does not pass through the format check portion A $14_{-1}$. On the other hand, the contradictory format detecting portion B $491_{-2}$ does not make a decision that the row is contradictory to the format. Accordingly, the row is passed through the format check portion B $14_{-2}$ and sent to the preceding register 16, the comparator 17 and the output control portion 18, via the output control portion B $493_{-2}$.

The case where the scanner is applied on the row of "C1234567890" successively after the row of "C1234Y123E" is described hereafter. When the recognition result of "C1234567890" is obtained, the contradictory format detecting portion A $491_{-1}$ does not make a decision that the result is contradictory to the format. After a predetermined time measured by the timer A $494_{-1}$, the contradictory format generation storage portion A 492-1 is initialized to cancel the suppressing operation of the output control portion A $493_{-1}$ to thereby allow sending the output from the format check portion A $14_{-1}$ to the preceding register 16, the comparator 17 and the output control portion 18. Consequently, the recognition result of "C1234567890" obtained after the scanner has been applied on the row of "C1234567890" for a predetermined time, is sent out through the output control portion A $493_{-1}$. On the other hand, the contradictory format detecting portion B $491_{-2}$ makes a decision that the row is contradictory to the format. The decision is stored in the contradictory format generation storage portion B $492_{-2}$, so that the output of the output control portion B $493_{-2}$ is suppressed. However, there is no actual harm, because the row originally does not pass through the format check portion B $14_{-2}$.

Eleventh Embodiment

Figure 29:
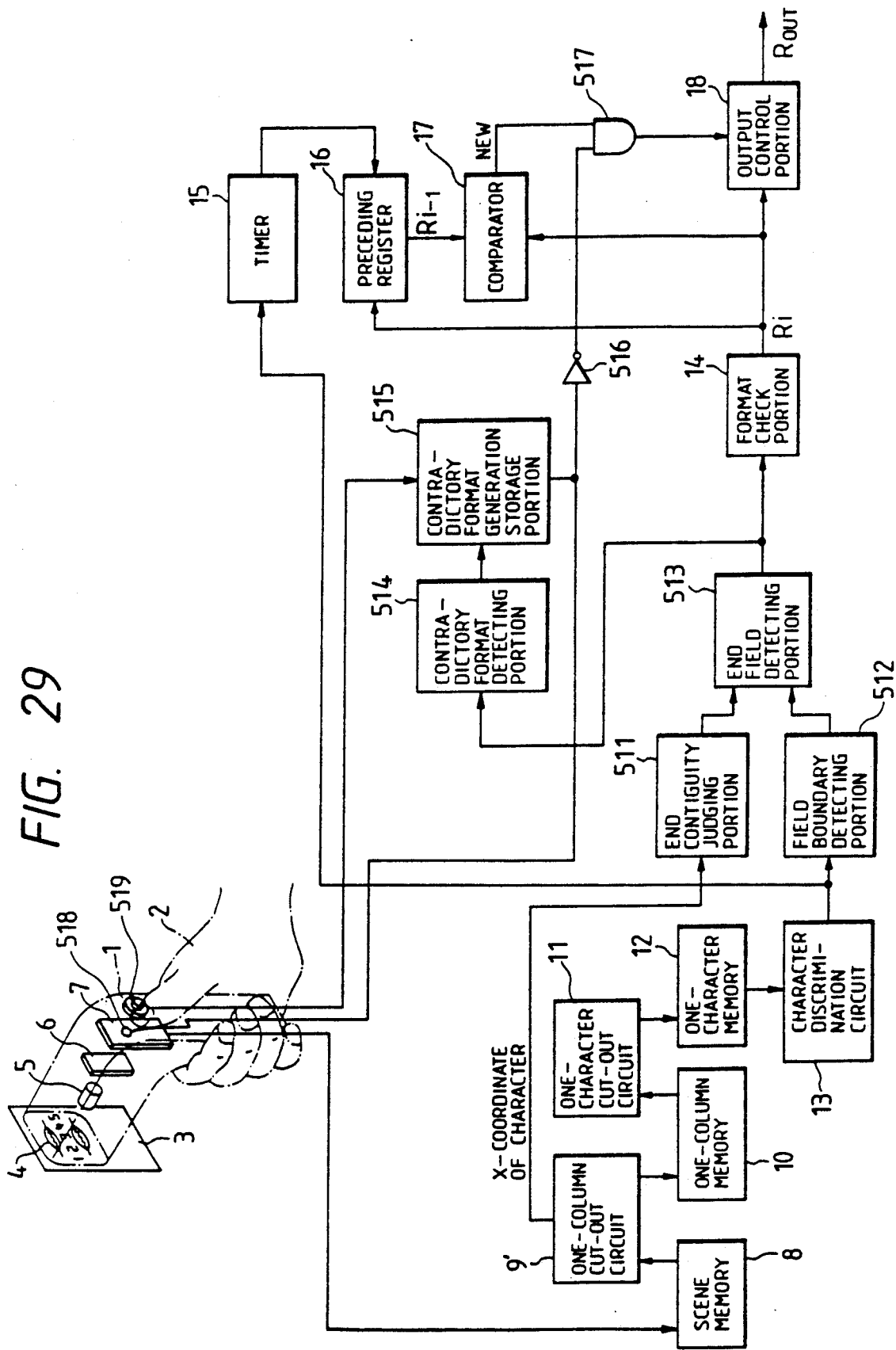
FIG. 29 is a diagram showing an eleventh embodiment of the present invention.

According to the ninth and tenth embodiments, when the scanner is applied on a field so that a part of the field overflows the view range thereof, the part overflowing the view range cannot be recognized. Accordingly, the recognition result in which an end of the field is broken is obtained from the character recognizing circuit 13. Therefore, these embodiments have a demerit in that judgment as to whether the recognition result is contradictory to a predetermined format cannot be simply made from shortage of characters in number. To judge from shortage of characters whether the recognition result is contradictory to the format or not, the first and third aspects of the present invention may be used in combination as shown in FIG. 29. In this embodiment, an indicating means is provided to tell the operator that the result contradictory to the format is not read out. Substantial suppression of reading is attained by controlling the output control portion 18.

The end contiguity judging portion 511, the field boundary detecting portion 512 and the end field detecting portion 513 serve as means for removing the field probably overflowing the view range. The operation is described with reference to FIG. 6. FIG. 6(a) shows a row written on the price tag 40. FIG. 6(b) shows the positional relationship between the view range 30 and the row on which the scanner is applied. Because character recognition is carried out for characters contained in the view range, the result of character recognition obtained from the character recognizing circuit 13 is as shown in FIG. 6(c). In FIG. 6(c), the symbol ($c_1$) represents a part of a field overflowing the view range at its left end, and the symbol ($c_3$) represents a part of a field overflowing the view range at is right end. The end contiguity judging portion 511 receives the x-coordinate of a character cutting point from the one-column cut-out circuit 9' to thereby judge whether the recognition result is in contiguity with either end of the view range or not. The portion 511 makes a decision that the recognition result is in contiguity with the left end of the view range if the x-coordinate $X_L$ of the left-end character satisfies the relation:

$$X_L \leq L_{th} \ldots \qquad (2)$$

in which $L_{th}$ represents the x-coordinate of the second character from the left end of the view range.

The portion 511 makes a decision that the recognition result is in contiguity with the right end of the view range if the x-coordinate $X_R$ of the right-end character satisfies the relation:

$$R_{th} \leq X_R \ldots \qquad (3)$$

in which $R_{th}$ represents the x-coordinate of the second character from the right end of the view range.

The field boundary detecting portion 512 serves as means for judging the boundary of fields. In the case of FIG. 6(c), two field boundaries are located between "0" and "N" and between "0" and "Y". When the end contiguity judging portion 511 makes a decision that the relation (2) is established, the end field deleting portion 513 deletes the recognized character row from the left end to the first field boundary. When the end contiguity judging portion 511 makes a decision that the relation (3) is established, the end field deleting portion 513 deletes the recognized character row from the right end to the first field boundary. The result after deleting is shown in FIG. 6(d).

By the aforementioned function, fields probably overflowing the view range at both ends thereof can be deleted. Consequently, the field obtained through the end field deleting portion 513 has not broken ends caused by different in the way of applying the scanner thereon, so that the field is as written on the price tag. Accordingly, shortage of characters in number can be checked by the contradictory format detecting portion.

The respective functions of the contradictory format detecting portion 514 and the contradictory format generation storage portion 515 are the same as those in the ninth and tenth embodiments. In this embodiment, suppression of reading after detection of contradictory format generation is attained by an inverter gate 516 and an AND gate 517 which serve to prevent the NEW signal of the comparator 17 from being transmitted to the output control portion 18. Further, a format error alarm lamp 518 is provided to alarm that the price tag contradictory to the format is recognized. The lamp 518 operates while the generation of contradictory format is stored in the contradictory format generation storage portion 515. Cancellation of the contradictory format generation storage portion 515 is carried out through a format error cancellation push-button switch 519 pushed by the operator. To alarm the contradictory format generation to the operator, a sound means (such as a buzzer or the like) may be used. Further, when the contradictory format detecting portion 514 detects the contradictory format, the fact may be reported to an upper-rank apparatus (such as a POS register to which the optical character reader is connected) instead of the operator so that the contradictory format generation storage portion 515 is initialized according to the cancellation instructions from the upper-rank apparatus.

Twelfth Embodiment

Figure 30A:
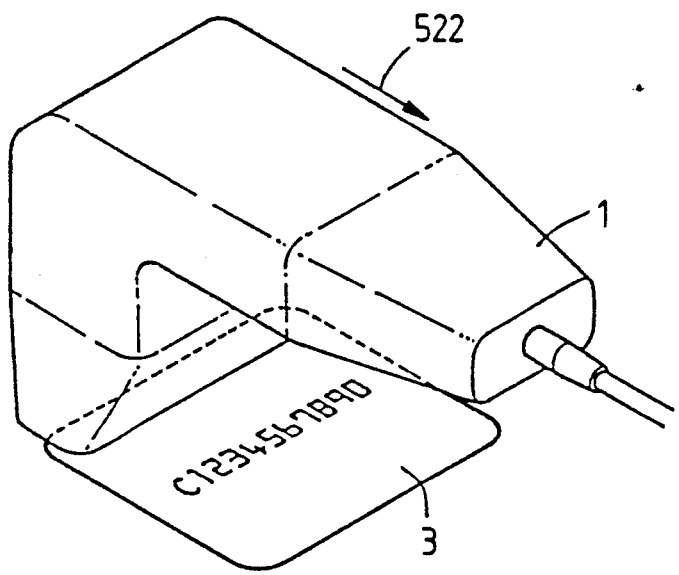
FIGS. 30(a) and 30(b) are views for explaining the handling of the scanner.
Figure 30B:
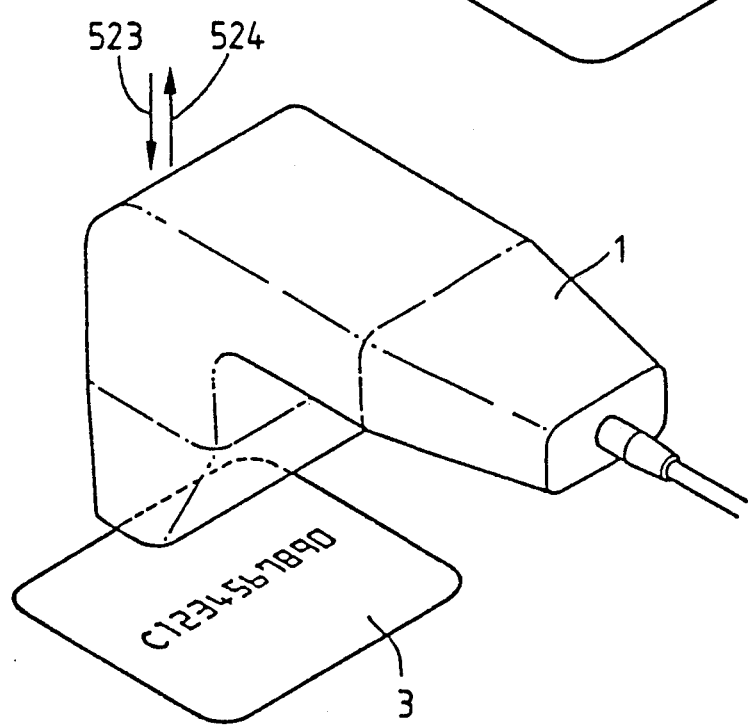
Figure 31:
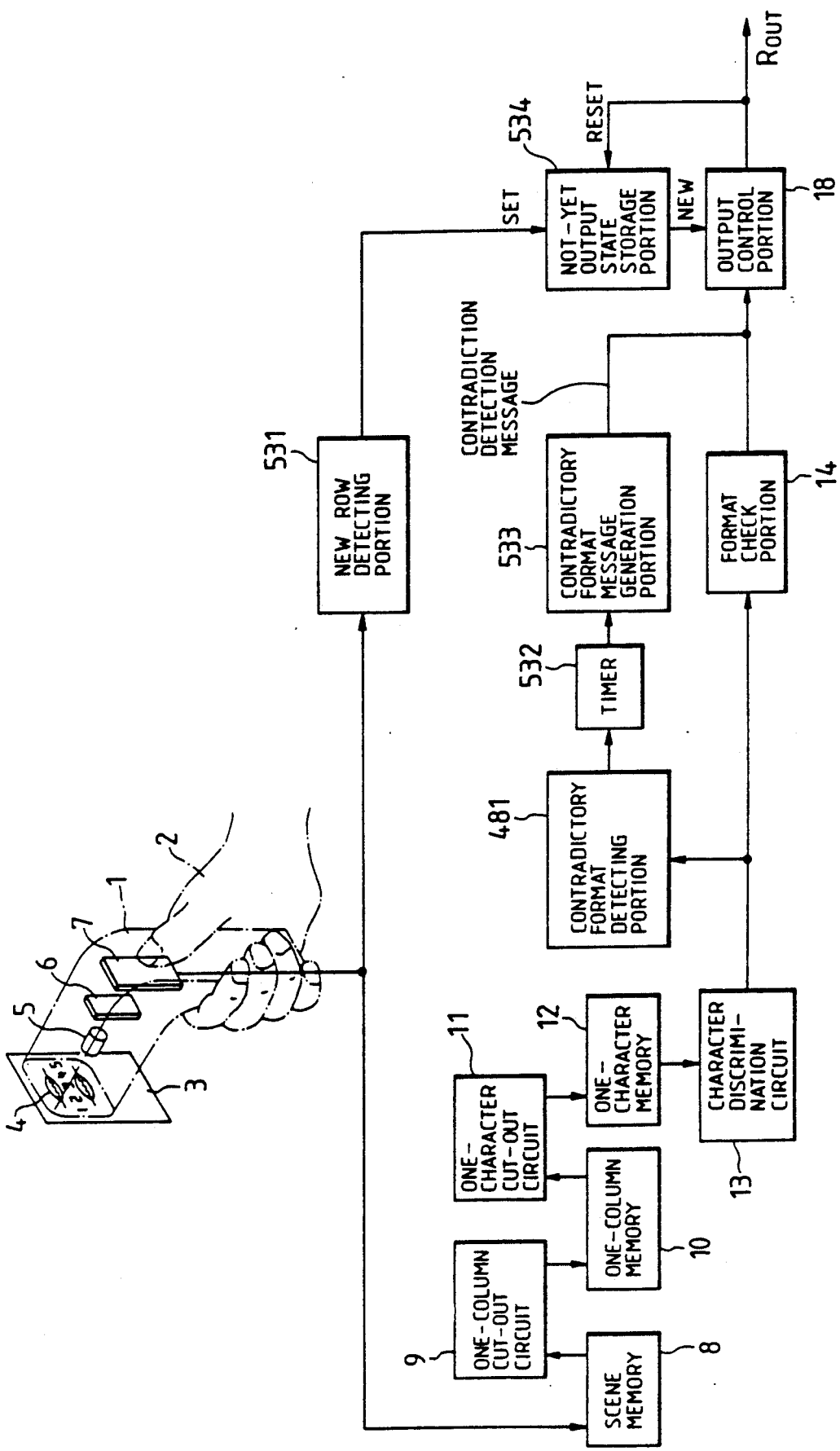
FIG. 31 is a diagram showing a twelfth embodiment of the present invention.

As a method of handling the scanner 1 to apply on the price tag, a handling method of moving down (522) the scanner while keeping the scanner in close contact with a surface of the price tag as shown in FIG. 30(a) is employed. As another method, a handling method of making (523) the scanner approach the row from above to read the row and, thereafter, floating up (524) the scanner from the surface of the price tag to separate the scanner from the price tag as shown in FIG. 30(b) is employed too. In the case of the optical character reader permitting the handling method as shown in FIG. 30(b), misreading transiently occurs while the scanner is moved close to or apart from the surface of the price tag, so that the recognition result may become contradictory to a predetermined format. A twelfth embodiment of the invention constructed on the consideration of such circumstances is shown in FIG. 31. In this embodiment, such contradiction to the predetermined format as transiently occurring while the scanner is moved close to the surface of the price tag is ignored. For such contradiction to the predetermined format as possibly occurring while the scanner is moved apart from the surface of the price tag after reading of the row, a message for indicating the contradictory format generation is not sent to the upper-rank apparatus. Although the embodiment of FIG. 27 has shown the case where the exchange of subjects is used as the condition of canceling the suppression of reading due to the contradictory format detection, this embodiment of FIG. 31 is applicable to the case where the exchange of rows is used as the condition of canceling the suppression of reading.

In FIG. 31, parts designated by the reference numerals 1 to 18 have the same function as parts designated by like reference numerals in FIG. 27. In FIG. 31 the reference numeral 531 designates a new row detecting portion for checking the existence of the character row in the view range. When a new row enters into the view range, the portion 531 serves to set a not-yet output state storage portion 534. The reference numeral 532 designates a timer which serves to transmit the occurrence of contradiction to a contradictory format message portion 533 when contradiction to the predetermined format is continuously detected by the contradictory format detecting portion 481 for a predetermined time. The contradictory format message portion 533 serves as a portion for generating a message for telling the upper-rank apparatus that the recognition result is contradictory to the predetermined format. The message of detection of contradiction from the portion 533 and the recognition result from the format check portion 14 are transmitted to the output control portion 18. The not-yet output state storage portion 534 is provided for the purpose of sending out the recognition result as the output $R_{OUT}$ from the output control portion 18 only once corresponding to the same row entering into the view range. When the new row detecting portion 531 detects a new row entering into the view range, the portion 534 gives the signal of NEW to the output control portion 18 to make the sending-out of the recognition result possible. The signal of NEW is continuously given till the sending-out of the recognition result is terminated.

The operation in the case (523) where the scanner is moved close to the surface of the price tag is as follows. The not-yet output state storage portion 534 is set by the function of the row detecting portion 531 so that the output control portion 18 is in an output-enable state. Though the recognition result obtained from the character recognizing circuit 13 includes misreading and, accordingly, the contradiction thereof to the predetermined format is detected, the contradictory format message generating portion 533 does not easily operate according to the effect of the timer 532. Because the preset time (for example, 0.5 second) of the timer 532 is longer than the time (for example, 0.3 second) required for moving the scanner close to the surface of the price tag, the scanner 1 is brought into contact with the surface of the price tag by the operation of the arrow 523 before the contradictory format message generating portion 533 operates.

If a correct recognition result is obtained from the character recognizing circuit 13 through the scanner 1 touching the surface of the price tag, the recognition result is sent out as the output $R_{OUT}$ via the format check portion 14 and the output control portion 18. After the recognition result is once sent out, the not-yet output state storage portion 534 is reset to stop the generation of the signal of NEW. Accordingly, the recognition result for the same row is not sent out though the recognition result for the same row is repeatedly fed to the output control portion 18 from the format check portion 14.

In the case where some mistake as contradictory to the predetermined format exists in a row written on the price tag, the contradiction is detected by the contradictory format detecting portion 481 during the time (for example, 1 second) the scanner is applied on the surface of the price tag. Of course, in this case the recognition result does not pass through the format check portion 14. When the detection period of the portion 481 becomes longer than the preset time (for example, 0.5 second) of the timer 532, the contradictory format message generating portion 533 starts so that a contradiction detecting message is sent out as the output $R_{OUT}$ via the output control portion 18. Even if a recognition result as passing through the format check portion 14 is obtained according to misreading after that, the recognition result is never sent out as the output $R_{OUT}$ via the output control portion because the not-yet state storage portion 534 is kept in a reset state. In this embodiment, the reading suppressing function of the contradictory format suppressing means is attained by resetting the not-yet state storage portion 534 by passing the contradiction detecting message through the output control portion 18.

In general, misreading transiently occurs according to the floating-up of the scanner 1 while the scanner 1 is separated from the surface of the price tag. Consequently, the contradictory format detecting portion 481 may make a decision that the recognition result obtained from the character recognizing circuit 13 is contradictory to the predetermined format. However, if the scanner is perfectly separated from the surface of the price tag before the measurement of time by the timer 532 is finished, the contradiction detecting message is never sent out from the contradictory format message generating portion 533. Even if the time required for perfectly separating the scanner from the surface of the price tag is so long that the contradiction detecting message may be sent out through the operation of the timer 532 and the contradictory format message generating portion 533, the contradiction detecting message is never sent out from the output control portion 18 after a correct-format row written on the price tag has been correctly read out and sent out, because the not-yet state storage portion 534 is reset by the output of the reading result of the row.

An example of the new row detecting portion 531 is shown in FIG. 32. A horizontal OR circuit 541 and a black length judging portion 542 are provided to judge whether some row exists or not. The principle of the operation thereof is described with reference to FIG. 33. In FIG. 33 the reference numeral 30 designates the range of view of the image sensor. The horizontal OR circuit 541 makes such an operation that the result of the operation is considered to be "1" if at least one black pixel exists in the central range (W in FIG. 33) about one-third as long as the view range of the image sensor when seen along a horizontal line and, on the other hand, is considered to be "0" if no black pixel exists in the central range W when seen along a horizontal line. In the case of the scene of FIG. 33(a), the result of the horizontal ORing operation is as shown in FIG. 33(b). In the range in which characters exist, "black" is continued in the column direction (vertical direction) (as represented by in FIG. 33). The black length judging portion 542 examines the range of "black". If y takes a value suited to "character", the portion 542 makes a decision that some row exists in the view range. In the case where the height of the view range is so less than the sum height of a character and an inter-linear space that a plurality of rows cannot be at once contained in the view range, the change from the state of absence of row to the state of presence of row expresses the fact that a new row enters into the view range. The not-yet output state storage portion 534 has to be in a set state when such a new row enters into the view range. Accordingly, the portion 534 may be set at the point of time when the new row enters into the view range or may be set at the point of time when the old row goes out of the view range. The judgment as to the exchange of rows may be carried out by reference to the direction of entrance/exit of rows relative to the view range as proposed in Japanese Patent Application No. 62-141791 by the inventor of this application. Although this embodiment has shown the case where the range in which the horizontal OR circuit 541 performs horizontal ORing of black pixels is established to be one-third as long as the view range, the invention is applicable to the case where the horizontal OR range may be separated into a plurality of regions within the view range as disclosed in U.S. Pat. Application Ser. No. 07/071,712 filed by the inventors including the inventor of this application.

Thirteenth Embodiment

Figure 34:
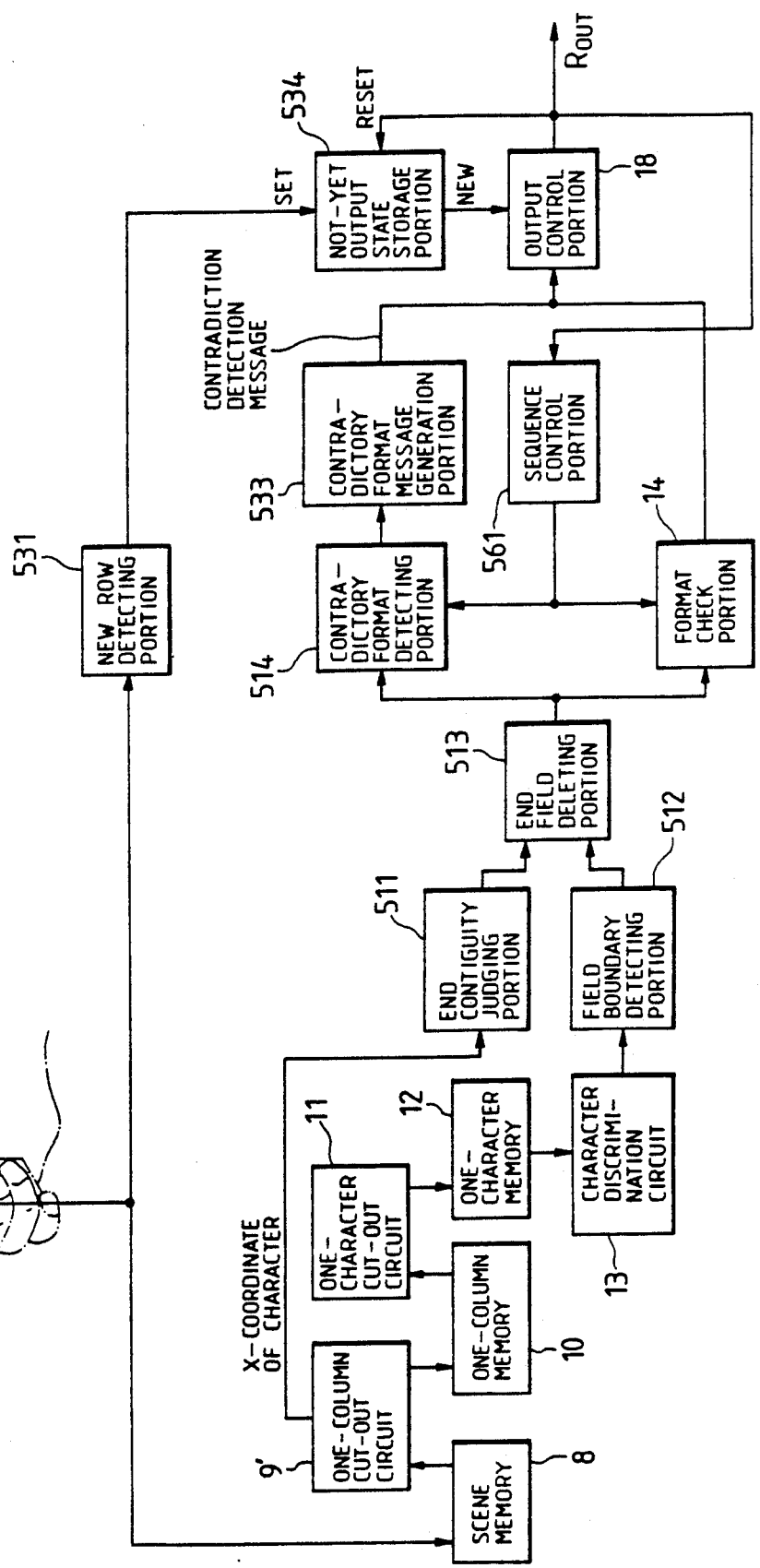
FIG. 34 is a diagram showing a thirteenth embodiment of the present invention.

Heretofore, sequence check has been used for reading a plurality of rows written on one price tag in regular order. An embodiment in which such sequence check is used in the invention is shown in FIG. 34. In this embodiment, all portions except a sequence control portion 561 are constructed in combination of the embodiments of FIGS. 29 and 31. To give a simplest example, the timer 532 of FIG. 31 is not shown.

The sequence control portion 561 gives the format of the row to be read next and the format contradiction judging condition to the format check portion 14 and the contradictory format detecting portion 514, respectively. The instructions of the sequence control portion 561 are described with reference to the case where the price tag of FIG. 5(a) is read as an example.

When the first row is read, the format check content A of the format check portion 14 and the contradiction judging condition B of the contradictory format detecting portion 514 are as follows.

(A-1) Ten numerical characters are continued from the right side of "C".

(B-1) If the character "C" appears without any rejection and ten numerical characters are not continued from the right side of "C", the row is contradictory to the format.

By registering the format check content A and the contradiction judging condition B as described above, the second and third rows of the price tag of FIG. 5(a) are prevented from passing through the format check portion 14 though the scanner is applied on the rows, so that the contradictory format detecting portion 514 cannot detect the format contradiction. When the scanner is applied on the first row, the recognition result is sent out through the format check portion 14 and output control portion 18. Or when the scanner is applied on the row of FIG. 7(b), the contradictory format detecting portion 514 detects the format contradiction because the recognition result is in accord with the condition (B-1). Then the contradiction detecting message is sent out through the output control portion 18 so that the not-yet output state storage portion 534 is reset. Consequently, the output of reading of the same row is suppressed.

When the first row of FIG. 5(a) is correctly read out and sent out, the sequence control portion 561 prepares for reading the second row so that thus the format check content A of the format check portion 14 and the contradiction judging condition B of the contradictory format detecting portion 514 can be updated as follows.

(A-2) Ten numerical characters are continued from the right side of "N".

(B-2) If the character "N" appears without any rejection and ten numerical characters are not continued from the right side of "N", the row is contradictory to the format.

By registering the format check content A and the contradiction judging condition B as described above, the first and third rows of the price tag of FIG. 5(a) are prevented from passing through the format check portion 14 though the scanner is applied on the rows, so that the contradictory format detecting portion 514 cannot detect the format contradiction. When the scanner is applied on the second row, the recognition result is sent out through the format check portion 14 and output control portion 18. In the case where the recognition result is in accord with the condition (B-2) by the reason that the second row has been miswritten, it is a matter of course that the contradiction detecting message is sent out through the output control portion 18 in the same manner as in the case of the first row.

When the second row of FIG. 5(a) is correctly read out and sent out, the sequence control portion 561 prepares for reading the third row so that thus the format check content A of the format check portion 14 and the contradiction judging condition B of the contradictory format detecting portion 514 can be updated as follows.

(A-3) Six numerical characters are continued from the right side of "Y".

(B-3) If the character "Y" appears without any rejection and six numerical characters are not continued from the right side of "Y", the row is contradictory to the format.

By registering the format check content A and the contradiction judging condition B as described above, the first and second rows of the price tag of FIG. 5(a) are prevented from passing through the format check portion 14 though the scanner is applied on the rows, so that the contradictory format detecting portion 514 cannot detect the format contradiction. When the scanner is applied on the third row, the recognition result is set out through the format check portion 14 and output control portion 18. In the case where the recognition result is in accord with the condition (B-3) by the reason that the third row has been miswritten, it is a matter of course that the contradiction detecting message is sent out through the output control portion 18 in the same manner as in the cases of the first and second rows.

When the third row of FIG. 5(a) is correctly read out and sent out, the sequence control portion 561 prepares for reading the first row so that thus the format check content A of the format check portion 14 and the contradiction judging condition B of the contradictory format detecting portion 532 can be updated as (A-1) and (B-1) again.

While various constructions have been shown in the embodiments of ninth to thirteenth, it is a matter of course that the invention is not limited to the specific embodiments and that modifications and combinations thereof may be made by use of micro-processor with software.

Fourteenth Embodiment

Such a construction as including all of the aspects (first to third) of the invention can be made. the construction is shown in FIG. 35 in which constituent parts are the same as parts in FIGS. 8, 19 and 26.

FIG. 36 shows a fourteenth embodiment having the aforementioned construction, in which a dummy adding circuit 261 as a field-end touching character detecting means 222 is added to those constituent parts in the embodiment of FIG. 29 so that the effective reading width of the view range can be enlarged.

In the following the effects of the invention are described.

According to the invention, an optical character reader which can read a multi-field row longer than the view range can be provided.

Accordingly, targets which can be read by the optical character reader can be widened, so that the scope of use of the reader according to the invention can be enlarged.

Or the scope of selection as to the method of writing fields on the price tag can be increased. For example, horizontally long price tags as shown in FIG. 6(a) can be stuck to horizontally long articles and can be read by the reader.

It is apparent from FIGS. 18(b), 18(c) and 18(d) that constants in the relations (1), (6) and (7) satisfy the following relations:

$$R_{th} < R'_{th} < E_R$$

$$L_{th} > L'_{th} > E_L$$

Comparing the values of maximum field length as respectively satisfying the relations (1) and (6), the effective reading width can be increased by the sum of $R'_{th} - R_{th}$ and $L_{th} - L'_{th}$ according to the invention. Because $R'_{th} - R_{th}$ and $L_{th} - L'_{th}$ are respectively equal to the character width (about 1.8 mm), it can be expected that the reading width is increased by one character's length or more on consideration of the sum of these values when, for example, characters are typed in the pitch of 2.54 mm.

According to the invention, characters in contact with both end of the view range of the image sensor can be detected, so that the effective reading width can be increased. Accordingly, the following effect can be brought.

* Field length as possibly being read is increased.
* Easy handling is attained, because the operation of applying the scanner to satisfy the relation (6) is easier than the operation of applying the scanner to satisfy the relation (1) if the field length is the same as in the prior art.

According to the invention, misreading due to the error of the format can be prevented. In the embodiment as having means for alarming the error of the format to the operator, the operator can know the abnormality of the subject easily, so that such useless efforts as to make the reader read the subject by some means or other can be avoided.

In addition, the invention has an effect that unsuitable handling can be eliminated to conduct the education of the operator. When an attempt to read the price tag correctly written is made by suitable handling, the price tag can be read correctly. However, when an attempt to read the price tag is made by unsuitable handling (for example, attempt to read the price tag while the scanner is kept apart from the price tag), misreading occurs to make it impossible to read the price tag. In other words, unsuitable handling is rejected. At the same time, the reader alarms format error to the operator. By the alarming, the operator can be asked to reconsider the unsuitability of the handling. Consequently, the operator will always try to handle the reader more suitably to read the price tag.

What is claimed is:

1. An optical character reader, comprising:
    an image sensor for catching one or a plurality of fields of characters including symbols in a range of view thereof, and outputting an analog signal;
    binary encoding means for converting said analog signal into a binary signal;
    character recognizing means for recognizing each of said characters in said range of view of said image sensor on the basis of said binary signal, and outputting a recognition result and positional information;
    field selecting means for selecting a perfect field which is perfectly contained in said range of view on the basis of said recognition result and said positional information, said field selecting means deleting characters outside said perfect field and within said range of view; and
    format check means for judging whether said perfect field is in accord with a predetermined format.

2. An optical character reader according to claim 1, wherein said field selecting means comprises:
    a field dividing portion for dividing said recognition result and said positional information into every recognition result of each said field and every positional information of each said field, respectively;
    a field position judging portion, responsive to the positional information of each said field, for judging whether each of divided fields is in contiguity with an end of said range of view; and
    a field take-out portion, responsive to said result of recognition of said each field, for selectively taking out a field which is judged not in contiguity with said end of said range of view as said perfect field.

3. An optical character reader according to claim 1, wherein said field selecting means comprises:
    an end contiguity judging portion for judging whether a recognized character is in contiguity with an end of said range of view;
    a field boundary detecting portion for detecting a field boundary; and
    an end field deleting portion for deleting recognized characters from said end of said range of view to a first field boundary to thereby select said perfect field.

4. An optical character reader according to claim 2, further comprising a field length judging portion for judging whether each of said divided fields is longer than a predetermined length wherein said take-out portion further takes out a field which is longer than said predetermined length as said perfect field.

5. An optical character reader according to claim 1, further comprising a view-end touching character detecting means for detecting a character touching an end of said range of view of said image sensor.

6. An optical character reader according to claim 5, wherein said view-end touching character detecting means comprises a dummy adding a portion for adding dummy signal to said binary signal, and said character recognizing means recognizes each of said characters on the basis of binary signal including said dummy signal.

7. An optical character reader according to claim 5, wherein said view-end touching character detecting means comprises a black pixel detecting portion for judging whether black pixels are present in an area of said end of said range of view.

8. An optical character reader according to claim 7, wherein pixels of said image sensor used in said black pixel detecting portion are different from pixels of said image sensor in a range of character recognition.

9. An optical character reader comprising:
    an image sensor for catching one or a plurality of fields of characters including symbols in a range of view thereof, and outputting an analog signal;
    binary encoding means for converting said analog signal into a binary signal;
    character recognizing means for recognizing each of said characters in said range of view of said image sensor on the basis of said binary signal, and outputting a recognition result;
    contradictory format suppressing means for judging whether said recognition result is contradictory to a predetermined format, and substantially suppressing reading of characters after a judgment that said recognition result is contradictory to said predetermined format; and
    subject-exchange check means for detecting exchange of subjects, wherein said reading of characters is re-started when said exchange of subjects is detected by said subject-exchange check means after said judgment that said result of recognition is contradictory to said predetermined format.

10. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result;
contradictory format suppressing means for judging whether said recognition result is contradictory to a predetermined format, and substantially suppressing reading of characters after a judgment that said recognition result is contradictory to said predetermined format; and
timer means for measuring a predetermined period, wherein said reading of characters is re-started when contradiction of said recognition result to said predetermined format is not detected for said predetermined period after said contradiction is once detected.

11. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result and positional information;
contradictory format suppressing means for judging whether said recognition result is contradictory to a predetermined format, and substantially suppressing reading of characters after a judgment that said recognition result is contradictory to said predetermined format; and
field selecting means for selecting a perfect field which is perfectly contained in said range of view on the basis of said recognition result and said positional information, said contradictory format suppressing means judging whether said recognition result is contradictory to said predetermined format only for said perfect field.

12. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result;
contradictory format suppressing means for judging whether said recognition result is contradictory to a predetermined format, and substantially suppressing reading of characters after a judgment that said recognition result is contradictory to said predetermined format; and
notification means for giving a notice of detection of contradiction to said predetermined format when said contradiction is detected.

13. An optical character reading according to claim 12, further comprising means for receiving an instruction of cancellation, wherein said reading of characters is re-started when said instruction of cancellation is received after said contradiction of said recognition result to said predetermined format is once detected.

14. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result;
contradictory format suppressing means for judging whether said recognition result is contradictory to a predetermined format, and substantially suppressing reading of characters after a judgment that said recognition result is contradictory to said predetermined format; and
new row detecting means for detecting exchange of rows in said view range of said image sensor, wherein said reading of characters is re-started when entrance of said new row into said view range is detected by said new row detecting means after said contradiction of said recognition result to said predetermined format is once detected.

15. An optical character reader according to claim 12, further comprising new row detecting means for detecting exchange of rows in said view range of aid image sensor, wherein said notification means gives said notice when said contradiction of recognition result of a row to said predetermined format is detected before reading of said row, and contrarily, does not give said notice even when said contradiction of said recognition result of said row to said predetermined format is detected after said reading of the row.

16. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result; and
contradictory format suppressing means for judging whether said recognition result is contradictory to a predetermined format, and substantially suppressing reading of characters after a judgment that said recognition result is contradictory to said predetermined format, said contradictory format suppressing means comprising contradictory time measuring means for measuring elapsed period in which said recognition result continues contradictory to said predetermined format, and said contradictory format suppressing means substantially suppresses said reading of characters if said elapsed period is longer than a predetermined period.

17. An optical character reader comprising:
an image sensor for catching one or a plurality of fields of characters including symbols in a range of view thereof, and outputting an analog signal;
binary encoding means for converting said analog signal into a binary signal;
character recognizing means for recognizing each of said characters in said range of view of said image sensor on the basis of said binary signal, and outputting a recognition result;

contradictory format suppressing means for judging whether said recognition result is contradictory to a predetermined format, and substantially suppressing reading of characters after a judgment that said recognition result is contradictory to said predetermined format; and reading sequence control means for changing a condition of contradiction judgment which is used in said contradictory format suppressing means with an advance of a reading sequence detected by said reading sequence control means.

* * * * *